US011586167B2

(12) United States Patent
Cooley et al.

(10) Patent No.: US 11,586,167 B2
(45) Date of Patent: *Feb. 21, 2023

(54) AUTOMATIC DISCOVERY OF RELATIONSHIPS AMONG EQUIPMENT THROUGH OBSERVATION OVER TIME

(71) Applicant: Mapped Inc., El Segundo, CA (US)

(72) Inventors: Shaun Cooley, El Segundo, CA (US); Jose De Castro, San Francisco, CA (US); Jason Koh, San Diego, CA (US)

(73) Assignee: MAPPED INC., El Segundo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/372,242

(22) Filed: Jul. 9, 2021

(65) Prior Publication Data

US 2022/0147008 A1 May 12, 2022

Related U.S. Application Data

(60) Provisional application No. 63/112,268, filed on Nov. 11, 2020.

(51) Int. Cl.
*G05B 19/05* (2006.01)
*G06K 9/62* (2022.01)
(Continued)

(52) U.S. Cl.
CPC .......... *G05B 19/054* (2013.01); *G05B 19/05* (2013.01); *G06F 9/54* (2013.01); *G06F 16/212* (2019.01);
(Continued)

(58) Field of Classification Search
CPC ..................................................... G06N 20/00
(Continued)

(56) References Cited

U.S. PATENT DOCUMENTS 5,663,891 A 9/1997 Bamji et al.
5,729,466 A 3/1998 Bamji
(Continued)

FOREIGN PATENT DOCUMENTS

WO WO-9913418 A1 3/1999
WO WO-2020089259 A1 5/2020
(Continued)

OTHER PUBLICATIONS

Cheong. Four ways to quantify synchrony between time series data. Towards Data Science Available athttps://towardsdatascience.com/four-ways-to-quantify-synchrony-between-time-series-data-b99136c4a9c9 (May 13, 2019).
(Continued)

*Primary Examiner* — Md Azad
(74) *Attorney, Agent, or Firm* — Wilson Sonsini Goodrich & Rosati

(57) ABSTRACT

Described are platforms, systems, and methods to discover relationships among equipment in automated industrial or commercial environments by looking for synchrony in state changes among the equipment. The platforms, systems, and methods identify a plurality of data sources associated with an automation environment; detect one or more events or one or more state changes in the data sources; store the detected events or state changes; detect synchrony in the detected events or state changes by performing operations comprising: identifying combinatorial pairs of data sources having an event or state change within a predetermined time window; and conducting pairwise testing for each identified combinatorial pair of data sources by applying an algorithm to the stored detected events or state changes; and determine one or more relationships for at least one identified combinatorial pair of data sources.

29 Claims, 5 Drawing Sheets

(51) Int. Cl.
*G06N 20/00* (2019.01)
*G06F 16/25* (2019.01)
*G06F 16/21* (2019.01)
*H04L 41/12* (2022.01)
*G06F 16/901* (2019.01)
*G06F 9/54* (2006.01)

(52) U.S. Cl.
CPC ........ *G06F 16/254* (2019.01); *G06F 16/9024* (2019.01); *G06K 9/6263* (2013.01); *G06K 9/6278* (2013.01); *G06N 20/00* (2019.01); *H04L 41/12* (2013.01); *G05B 2219/1215* (2013.01); *G05B 2219/13129* (2013.01); *G05B 2219/15012* (2013.01); *G05B 2219/163* (2013.01)

(58) Field of Classification Search
USPC .......................................................... 700/47
See application file for complete search history.

(56) References Cited

U.S. PATENT DOCUMENTS

| | | | |
|---|---|---|---|
| 7,606,890 | B1 | 10/2009 | Baier et al. |
| 8,773,437 | B1 | 7/2014 | Goldman et al. |
| 8,819,206 | B2 | 8/2014 | Bandi et al. |
| 9,667,641 | B2 | 5/2017 | Muddu et al. |
| 10,019,536 | B2 | 7/2018 | Hong et al. |
| 10,044,630 | B2 | 8/2018 | Kriegesmann et al. |
| 10,216,706 | B1 | 2/2019 | Bonk et al. |
| 10,353,596 | B2 * | 7/2019 | Zhou ...................... G06F 3/061 |
| 10,540,383 | B2 * | 1/2020 | Cobbett ................ G06F 16/355 |
| 10,901,373 | B2 | 1/2021 | Locke et al. |
| 10,997,195 | B1 | 5/2021 | Sekar |
| 11,455,287 | B1 | 9/2022 | Hillion et al. |
| 2004/0049699 | A1 | 3/2004 | Griffith et al. |
| 2004/0210654 | A1 | 10/2004 | Hrastar |
| 2004/0260518 | A1 | 12/2004 | Polz et al. |
| 2007/0208440 | A1 | 9/2007 | Bliss et al. |
| 2009/0100407 | A1 | 4/2009 | Bouillet et al. |
| 2010/0014432 | A1 | 1/2010 | Durfee et al. |
| 2010/0257535 | A1 | 10/2010 | Badovinatz et al. |
| 2011/0004631 | A1 | 1/2011 | Inokuchi et al. |
| 2011/0087522 | A1 | 4/2011 | Beaty et al. |
| 2011/0179027 | A1 | 7/2011 | Das et al. |
| 2011/0295903 | A1 | 12/2011 | Chen |
| 2012/0084422 | A1 | 4/2012 | Bandi et al. |
| 2012/0158933 | A1 | 6/2012 | Shetty et al. |
| 2013/0124465 | A1 * | 5/2013 | Pingel ................... G06F 3/0604 707/610 |
| 2013/0232123 | A1 | 9/2013 | Ahmed et al. |
| 2014/0122806 | A1 | 5/2014 | Lin et al. |
| 2014/0277604 | A1 | 9/2014 | Nixon et al. |
| 2015/0074078 | A1 | 3/2015 | Roche et al. |
| 2015/0074117 | A1 | 3/2015 | Gorelik et al. |
| 2015/0095770 | A1 | 4/2015 | Mani et al. |
| 2015/0180891 | A1 | 6/2015 | Seward et al. |
| 2015/0256635 | A1 | 9/2015 | Casey et al. |
| 2015/0281105 | A1 | 10/2015 | Vaderna et al. |
| 2016/0019228 | A1 | 1/2016 | Hong et al. |
| 2016/0098037 | A1 | 4/2016 | Zornio et al. |
| 2016/0132538 | A1 | 5/2016 | Bliss et al. |
| 2016/0342707 | A1 | 11/2016 | Drobek et al. |
| 2016/0373481 | A1 | 12/2016 | Sultan et al. |
| 2017/0085438 | A1 | 3/2017 | Link et al. |
| 2017/0154080 | A1 | 5/2017 | De et al. |
| 2017/0168779 | A1 | 6/2017 | Sevenich et al. |
| 2017/0249434 | A1 | 8/2017 | Brunner |
| 2017/0286456 | A1 * | 10/2017 | Wenzel ................ G06F 16/212 |
| 2018/0173795 | A1 | 6/2018 | Cobbett et al. |
| 2018/0219888 | A1 | 8/2018 | Apostolopoulos |
| 2018/0219919 | A1 | 8/2018 | Crabtree et al. |
| 2018/0232459 | A1 | 8/2018 | Park et al. |
| 2019/0057064 | A1 | 2/2019 | Bonk et al. |
| 2019/0108197 | A1 | 4/2019 | Bonk et al. |
| 2019/0132145 | A1 * | 5/2019 | O'Hora .................... F24F 11/46 |
| 2019/0133026 | A1 | 5/2019 | Seaman et al. |
| 2019/0158353 | A1 | 5/2019 | Johnson et al. |
| 2019/0187643 | A1 * | 6/2019 | Carpenter ............ G05B 19/042 |
| 2019/0205148 | A1 | 7/2019 | Schur et al. |
| 2019/0220583 | A1 | 7/2019 | Douglas et al. |
| 2019/0324831 | A1 | 10/2019 | Gu |
| 2019/0384238 | A1 * | 12/2019 | Songkakul ............... F24F 11/63 |
| 2020/0004751 | A1 | 1/2020 | Stennett et al. |
| 2020/0280565 | A1 | 9/2020 | Rogynskyy et al. |
| 2020/0296137 | A1 | 9/2020 | Crabtree et al. |
| 2020/0327444 | A1 | 10/2020 | Negi et al. |
| 2020/0379992 | A1 | 12/2020 | De Smet |
| 2021/0073216 | A1 | 3/2021 | Chang et al. |
| 2021/0090694 | A1 | 3/2021 | Colley et al. |
| 2021/0133670 | A1 * | 5/2021 | Cella ...................... G06N 5/022 |
| 2021/0157312 | A1 * | 5/2021 | Celia ...................... G06N 20/00 |
| 2021/0157671 | A1 | 5/2021 | Shastri et al. |
| 2021/0273965 | A1 | 9/2021 | Pi et al. |
| 2021/0287459 | A1 | 9/2021 | Cella et al. |
| 2021/0293103 | A1 | 9/2021 | Olsen et al. |
| 2021/0333762 | A1 | 10/2021 | Govindaraj et al. |
| 2022/0156433 | A1 | 5/2022 | Laane et al. |

FOREIGN PATENT DOCUMENTS

| | | |
|---|---|---|
| WO | WO-2022059588 A1 | 3/2022 |
| WO | WO-2022103812 A1 | 5/2022 |
| WO | WO-2022103813 A1 | 5/2022 |
| WO | WO-2022103820 A1 | 5/2022 |
| WO | WO-2022103822 A1 | 5/2022 |
| WO | WO-2022103824 A1 | 5/2022 |
| WO | WO-2022103829 A1 | 5/2022 |
| WO | WO-2022103831 A1 | 5/2022 |

OTHER PUBLICATIONS

Co-pending U.S. Appl. No. 17/372,238, inventors Cooley; Shaun et al., filed Jul. 9, 2021.
Co-pending U.S. Appl. No. 17/372,247, inventors Cooley; Shaun et al., filed Jul. 9, 2021.
Co-pending U.S. Appl. No. 17/372,251, inventors Cooley; Shaun et al., filed Jul. 9, 2021.
Co-pending U.S. Appl. No. 17/372,256, inventors Cooley; Shaun et al., filed Jul. 9, 2021.
Co-pending U.S. Appl. No. 17/372,267, inventors Cooley; Shaun et al., filed Jul. 9, 2021.
Co-pending U.S. Appl. No. 17/372,275, inventors Cooley; Shaun et al., filed Jul. 9, 2021.
Grady et al. Robust classification of salient links in complex networks. Nat Commun 3:864 (May 29, 2012).
George et al. Big data and management. Academy of management Journal 57(2):321-326 (2014). Retrieved on Jan. 8, 2022 from https://journals.aom.org/doi/abs/10.5465/amj.2014.4002?journalCode=amj.
PCT/US2021/058748 International Search Report and Written Opinion dated Feb. 9, 2022.
PCT/US2021/058749 International Search Report and Written Opinion dated Dec. 22, 2021.
PCT/US2021/058756 International Search Report and Written Opinion dated Jan. 11, 2022.
PCT/US2021/058759 International Search Report and Written Opinion dated Dec. 22, 2021.
PCT/US2021/058762 International Search Report and Written Opinion dated Dec. 23, 2021.
PCT/US2021/058768 International Search Report and Written Opinion dated Jan. 24, 2022.
PCT/US2021/058771 International Search Report and Written Opinion dated Jan. 11, 2022.
U.S. Appl. No. 17/372,238 Non-Final Office Action dated Jan. 19, 2022.
U.S. Appl. No. 17/372,247 Non-Final Office Action dated Dec. 13, 2021.
U.S. Appl. No. 17/372,267 Final Office Action dated Feb. 9, 2022.
U.S. Appl. No. 17/372,251 Office Action dated Nov. 5, 2021.

(56) References Cited

OTHER PUBLICATIONS

U.S. Appl. No. 17/372,267 Office Action dated Oct. 26, 2021.
U.S. Appl. No. 17/372,256 Office Action dated Oct. 29, 2021.
U.S. Appl. No. 17/372,275 Office Action dated Nov. 10, 2021.
Kind et al.: Relationship Discovery with NetFlow to Enable Business-Driven IT Management. IEEE Xplore, Conference: Business-Driven IT Management, 2006, pp. 63-70 DOI:10.1109/BDIM.2006.1649212 (2006).
U.S. Appl. No. 17/372,238 Final Office Action dated Apr. 19, 2022.
U.S. Appl. No. 17/372,247 Final Office Action dated Apr. 26, 2022.
U.S. Appl. No. 17/372,251 Final Office Action dated Feb. 22, 2022.
U.S. Appl. No. 17/372,256 Final Office Action dated Feb. 18, 2022.
U.S. Appl. No. 17/372,267 Non-Final Office Action dated Jul. 21, 2022.
U.S. Appl. No. 17/372,275 Final Office Action dated Mar. 4, 2022.
U.S. Appl. No. 17/372,267 Final Office Action dated Oct. 24, 2022.
U.S. Appl. No. 17/372,247 Non-Final Office Action dated Nov. 14, 2022.

\* cited by examiner

AUTOMATIC DISCOVERY OF RELATIONSHIPS AMONG EQUIPMENT THROUGH OBSERVATION OVER TIME

CROSS-REFERENCE TO RELATED APPLICATIONS

This application is related to applications U.S. application Ser. No. 17/372,238, U.S. application Ser. No. 17/372,247, U.S. application Ser. No. 17/372,251, U.S. application Ser. No. 17/372,256, U.S. application Ser. No. 17/372,267, and U.S. application Ser. No. 17/372,275, all filed on the same date, Jul. 9, 2021, the same date on which the present application was filed. This application claims the priority and benefit of U.S. Provisional Application No. 63/112,268, filed Nov. 11, 2020, and entitled: DATA INTEGRATION AND ENRICHMENT PLATFORM FOR AUTOMATED INDUSTRIAL AND COMMERCIAL ENVIRONMENTS. All of these applications are incorporated herein by reference in their entireties.

BACKGROUND

Automation is the use of control systems to operate processes without human intervention. These systems generally include software, computers, beacons, sensors, actuators, and in some cases robotics. In industrial and commercial settings, benefits of automation include increases in productivity, accuracy, flexibility, and safety, while providing overall cost savings. A "smart building" uses a combination of technologies to automate building management. The terms "smart office" and "smart home" are used to describe a structure that uses technology to allow systems and electronics to communicate with one another, be controlled by a time schedule, and even be remotely activated from a smartphone or other web-enabled device. A few of the systems that can be controlled include lighting, heating, ventilation, air conditioning, vertical lifts, fire safety systems, appliances, and security systems. As such, smart buildings can provide comfort and convenience while enhancing security and energy efficiency. Cities of the future are anticipated to offer a wide array of "smart technologies," e.g., networked technology that controls aspects of transportation, energy, air, and water quality.

SUMMARY

Automated industrial and commercial environments are often the amalgamation of commodity components orchestrated through a Programmable Logic Controller (PLC) that was installed with custom logic by a third-party system integrator. These components may be internet-connected devices, sometimes called Internet of Things (IoT). Often times the exact logic contained in the PLC is not accessible for various reasons. For example, it might have been a decade or more since the PLC was configured and the integrator is no longer in business, or the integrator never provided credentials in order to maintain job security. While the automated environment might be flawlessly performing the task it was designed to perform, the owner or an interested party might want to better understand what logic exists, perhaps to build a digital twin of the environment. Further, significant value in comes from understanding the transitive and implicit relationships within the environment, such as geospatial relationships. These transitive and implicit relationships exist beyond the programming in the PLC. Understanding the explicitly defined, implicit, or transitive relationships usually requires that the existing environment be reverse engineered by hand, either directly in the PLC or through manually documenting all the devices and their relationships, which can take anywhere from a few weeks to a year, depending on the size and complexity of the environment.

Described herein are platforms, systems, and methods that automatically identify, monitor data sources, and detect event or state changes of data sources to detect synchrony between combinatorial pairs of data sources, and determine relationships between data sources in automated industrial and commercial environments and cloud system for purpose to identify the relationships between components (e.g., IoT devices).

The subject matter described herein includes platforms, systems, and methods that provide mechanisms to speed the discovery of relationships among equipment (e.g., components in the automated environment, IoT devices in the automated environment, etc.). By utilizing the subject matter described herein, the system may identify synchrony between devices quickly and thoroughly. The following components, in various embodiments, are needed to implement the platforms, systems, and methods described herein:

Data or data source discovery mechanism;
Event detection mechanism;
Synchrony detection mechanism;
Relationships determination mechanism
Machine learning mechanism; and
Data storage system.

Accordingly, in one aspect, disclosed herein are computer-implemented methods comprising: identifying a plurality of data sources associated with an automation environment; detecting one or more events or one or more state changes in the data sources; storing the detected events or state changes; detecting synchrony in the detected events or state changes by performing operations comprising: identifying combinatorial pairs of data sources having an event or state change within a predetermined time window; and conducting pairwise testing for each identified combinatorial pair of data sources by applying an algorithm to the stored detected events or state changes; and determining one or more relationships for at least one identified combinatorial pair of data sources. In some embodiments, the automation environment comprises at least one networked industrial or commercial automation system. In various embodiments, the plurality of data sources comprises at least one device, at least one programmable logic controller (PLC), at least one automation controller, at least one data file, at least one cloud service, or a combination thereof. In some embodiments, the plurality of data sources comprises at least one device utilizing a first communications protocol and at least one device utilizing a second communications protocol, wherein the first communications protocol is different from the second communications protocol. In various embodiments, the plurality of data sources comprises at least 1,000, at least 10,000, or at least 100,000 data sources. In various embodiments, the identifying the plurality of data sources is performed by passive discovery, active discovery, target interrogation, or a combination thereof. In further embodiments, the passive discovery comprises observing traffic on a network. In still further embodiments, the passive discovery comprises identifying an origin or a destination for the traffic on the network. In further embodiments, the active discovery comprises IP subnet scanning on a network, port scanning on a network, protocol specific ID enumeration on a control bus, issuing protocol specific discovery commands on a network, or a combination thereof. In further embodiments, the target interrogation comprises introspecting at least one PLC on a network. In some embodiments, detecting one or more events or one or more state changes comprises passive inspection of packets or payloads on an automation control network associated with the automation environment. In some embodiments, the detecting one or more events or one or more state changes comprises inspection of communications in accordance with a communication protocol. In further embodiments, the communication protocol comprises S7, BACnet, KNX, or a combination thereof. In various embodiments, detecting one or more events or one or more state changes comprises monitoring the automation environment for a predefined monitoring period, substantially continuously, or continuously. In some embodiments, detecting one or more events or one or more state changes is performed by a gateway in communication with the automation environment directly, indirectly, via a cloud service, or any combination thereof. In some embodiments, detecting one or more events or one or more state changes is performed by a slave controller in communication with the automation environment directly, indirectly, via a cloud service, or any combination thereof. In some embodiments, detecting one or more events or one or more state changes is performed by a computing device in communication with the automation environment directly, indirectly, via a cloud service, or any combination thereof. In some embodiments, detected events or state changes are stored in a timeseries database. In further embodiments, the timeseries database comprises a stream of events or state changes for each identified data source associated with an automation environment. In some embodiments, the method further comprises selecting the algorithm from a plurality of algorithms. In various embodiments, the algorithm comprises one or more of the following: Pearson correlation, Time Lagged Cross Correlation (TLCC), Windowed TLCC, Dynamic Time Warping (DTW), and Instantaneous Phase Synchrony. In further embodiments, the TLCC comprises a Granger causality test. In further embodiments, the Instantaneous Phase Synchrony comprises a Hilbert transform. In some embodiments, the algorithm comprises a machine learning model. In further various embodiments, the machine learning model comprises one or more of the following: one or more neural networks, one or more deep neural networks, one or more support vector machines (SVM), one or more Bayesian models, linear regression, logistic regression, or k-means clustering. In some embodiments, the method further comprises identifying a directionality in the one or more relationships. In various embodiments, the one or more relationships comprises one or more of the following: one or more explicitly defined relationships, one or more transitive relationships, one or more implicit relationships, one or more geospatial relationships. In some embodiments, the method further comprises providing error correction data pertaining to the one or more relationships as feedback to improve the algorithm. In some embodiments, the steps are performed by a computer-based platform automatically.

In another aspect, disclosed herein are systems comprising at least one computing device comprising at least one processor, a memory, and instructions executable by the at least one processor to create an application comprising: a software module identifying a plurality of data sources associated with an automation environment; a software module detecting one or more events or one or more state changes in the data sources; a software module storing the detected events or state changes; a software module detecting synchrony in the detected events or state changes by performing operations comprising: identifying combinatorial pairs of data sources having an event or state change within a predetermined time window; and conducting pair-wise testing for each identified combinatorial pair of data sources by applying an algorithm to the stored detected events or state changes; and a software module determining one or more relationships for at least one identified combinatorial pair of data sources. In some embodiments, the automation environment comprises at least one networked industrial or commercial automation system. In various embodiments, the plurality of data sources comprises at least one device, at least one programmable logic controller (PLC), at least one automation controller, at least one data file, at least one cloud service, or a combination thereof. In some embodiments, the plurality of data sources comprises at least one device utilizing a first communications protocol and at least one device utilizing a second communications protocol, wherein the first communications protocol is different from the second communications protocol. In various embodiments, the plurality of data sources comprises at least 1,000, at least 10,000, or at least 100,000 data sources. In various embodiments, the software module identifying the plurality of data sources utilizes passive discovery, active discovery, target interrogation, or a combination thereof. In further embodiments, the passive discovery comprises observing traffic on a network. In still further embodiments, the passive discovery comprises identifying an origin or a destination for the traffic on the network. In further embodiments, the active discovery comprises IP subnet scanning on a network, port scanning on a network, protocol specific ID enumeration on a control bus, issuing protocol specific discovery commands on a network, or a combination thereof. In further embodiments, the target interrogation comprises introspecting at least one PLC on a network. In some embodiments, the software module detecting one or more events or one or more state changes utilizes passive inspection of packets or payloads on an automation control network associated with the automation environment. In some embodiments, the software module detecting one or more events or one or more state changes utilizes inspection of communications in accordance with a communication protocol. In further embodiments, the wherein the communication protocol comprises S7, BACnet, KNX, or a combination thereof. In various embodiments, the software module detecting one or more events or one or more state changes monitors the automation environment for a predefined monitoring period, substantially continuously, or continuously. In some embodiments, the software module detecting one or more events or one or more state changes is implemented at a gateway in communication with the automation environment directly, indirectly, via a cloud service, or any combination thereof. In some embodiments, the software module detecting one or more events or one or more state changes is implemented at a slave controller in communication with the automation environment directly, indirectly, via a cloud service, or any combination thereof. In some embodiments, the software module detecting one or more events or one or more state changes is implemented at a computing device in communication with the automation environment directly, indirectly, via a cloud service, or any combination thereof. In some embodiments, the software module storing the detected events or state changes stores the detected events or state changes in a timeseries database. In further embodiments, the timeseries database comprises a stream of events or state changes for each identified data source associated with an automation environment. In some embodiments, the application further comprises a software module selecting the algorithm from a plurality of algorithms or providing an interface allowing a human user to select the algorithm from a plurality of algorithms. In various embodiments, the algorithm comprises one or more of the following: Pearson correlation, Time Lagged Cross Correlation (TLCC), Windowed TLCC, Dynamic Time Warping (DTW), and Instantaneous Phase Synchrony. In further embodiments, the TLCC comprises a Granger causality test. In further embodiments, the Instantaneous Phase Synchrony comprises a Hilbert transform. In some embodiments, the algorithm comprises a machine learning model. In various further embodiments, the machine learning model comprises one or more of the following: one or more neural networks, one or more deep neural networks, one or more support vector machines (SVM), one or more Bayesian models, linear regression, logistic regression, or k-means clustering. In some embodiments, the software module determining one or more relationships further identifies a directionality in the one or more relationships. In various embodiments, the one or more relationships comprises one or more of the following: one or more explicitly defined relationships, one or more transitive relationships, one or more implicit relationships, one or more geospatial relationships. In some embodiments, the application further comprises a software module providing error correction data pertaining to the one or more relationships as feedback to improve the algorithm. In some embodiments, the software modules are implemented at a computer-based platform and operate automatically.

In another aspect, disclosed herein are non-transitory computer-readable storage media encoded with instructions executable by one or more processors to provide an application comprising: a software module identifying a plurality of data sources associated with an automation environment; a software module detecting one or more events or one or more state changes in the data sources; a software module storing the detected events or state changes; a software module detecting synchrony in the detected events or state changes by performing operations comprising: identifying combinatorial pairs of data sources having an event or state change within a predetermined time window; and conducting pairwise testing for each identified combinatorial pair of data sources by applying an algorithm to the stored detected events or state changes; and a software module determining one or more relationships for at least one identified combinatorial pair of data sources. In some embodiments, the automation environment comprises at least one networked industrial or commercial automation system. In various embodiments, the plurality of data sources comprises at least one device, at least one programmable logic controller (PLC), at least one automation controller, at least one data file, at least one cloud service, or a combination thereof. In some embodiments, the plurality of data sources comprises at least one device utilizing a first communications protocol and at least one device utilizing a second communications protocol, wherein the first communications protocol is different from the second communications protocol. In various embodiments, the plurality of data sources comprises at least 1,000, at least 10,000, or at least 100,000 data sources. In various embodiments, the software module identifying the plurality of data sources utilizes passive discovery, active discovery, target interrogation, or a combination thereof. In further embodiments, the passive discovery comprises observing traffic on a network. In still further embodiments, the passive discovery comprises identifying an origin or a destination for the traffic on the network. In further embodiments, the active discovery comprises IP subnet scanning on a network, port scanning on a network, protocol specific ID enumeration on a control bus, issuing protocol specific discovery commands on a network, or a combination thereof. In further embodiments, the target interrogation comprises introspecting at least one PLC on a network. In some embodiments, the software module detecting one or more events or one or more state changes utilizes passive inspection of packets or payloads on an automation control network associated with the automation environment. In some embodiments, the software module detecting one or more events or one or more state changes utilizes inspection of communications in accordance with a communication protocol. In various further embodiments, the communication protocol comprises S7, BACnet, KNX, or a combination thereof. In various embodiments, the software module detecting one or more events or one or more state changes monitors the automation environment for a predefined monitoring period, substantially continuously, or continuously. In some embodiments, the software module detecting one or more events or one or more state changes is implemented at a gateway in communication with the automation environment directly, indirectly, via a cloud service, or any combination thereof. In some embodiments, the software module detecting one or more events or one or more state changes is implemented at a slave controller in communication with the automation environment directly, indirectly, via a cloud service, or any combination thereof. In some embodiments, the software module detecting one or more events or one or more state changes is implemented at a computing device in communication with the automation environment directly, indirectly, via a cloud service, or any combination thereof. In some embodiments, the software module storing the detected events or state changes stores the detected events or state changes in a timeseries database. In further embodiments, the timeseries database comprises a stream of events or state changes for each identified data source associated with an automation environment. In some embodiments, the application further comprises a software module selecting the algorithm from a plurality of algorithms or providing an interface allowing a human user to select the algorithm from a plurality of algorithms. In various embodiments, the algorithm comprises one or more of the following: Pearson correlation, Time Lagged Cross Correlation (TLCC), Windowed TLCC, Dynamic Time Warping (DTW), and Instantaneous Phase Synchrony. In further embodiments, the TLCC comprises a Granger causality test. In further embodiments, the Instantaneous Phase Synchrony comprises a Hilbert transform. In some embodiments, the algorithm comprises a machine learning model. In various further embodiments, the machine learning model comprises one or more of the following: one or more neural networks, one or more deep neural networks, one or more support vector machines (SVM), one or more Bayesian models, linear regression, logistic regression, or k-means clustering. In some embodiments, the software module determining one or more relationships further identifies a directionality in the one or more relationships. In various embodiments, the one or more relationships comprises one or more of the following: one or more explicitly defined relationships, one or more transitive relationships, one or more implicit relationships, one or more geospatial relationships. In some embodiments, the application further comprises a software module providing error correction data pertaining to the one or more relationships as feedback to improve the algorithm. In some embodiments, the software modules are implemented at a computer-based platform and operate automatically.

BRIEF DESCRIPTION OF THE DRAWINGS

A better understanding of the features and advantages of the present subject matter will be obtained by reference to the following detailed description that sets forth illustrative embodiments and the accompanying drawings of which.

DETAILED DESCRIPTION

Figure 1:
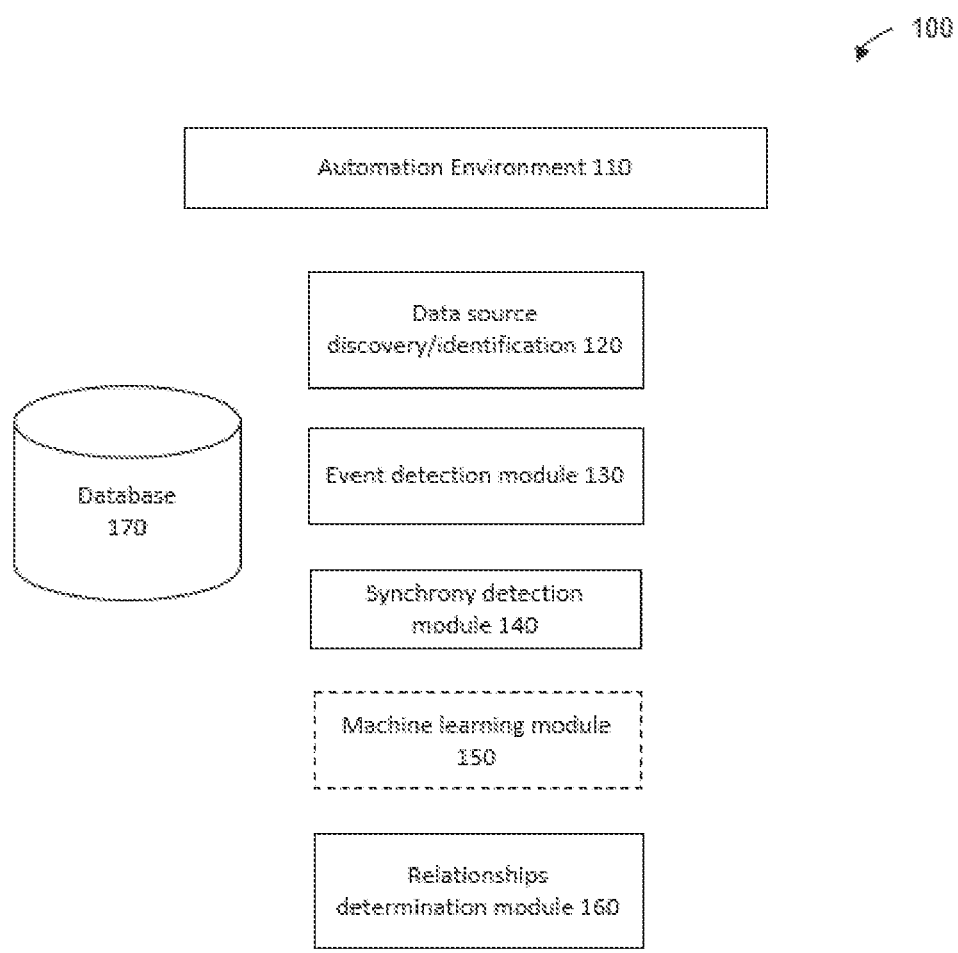
FIG. 1 shows a non-limiting example of a schematic diagram; in this case, a schematic diagram showing components (e.g., modules, mechanisms, etc.) utilized by embodiments described herein.

Described herein, in certain embodiments, are computer-implemented methods comprising: identifying a plurality of data sources associated with an automation environment; detecting one or more events or one or more state changes in the data sources; storing the detected events or state changes; detecting synchrony in the detected events or state changes by performing operations comprising: identifying combinatorial pairs of data sources having an event or state change within a predetermined time window; and conducting pairwise testing for each identified combinatorial pair of data sources by applying an algorithm to the stored detected events or state changes; and determining one or more relationships for at least one identified combinatorial pair of data sources.

Also described herein, in certain embodiments, are systems comprising at least one computing device comprising at least one processor, a memory, and instructions executable by the at least one processor to create an application comprising: a software module identifying a plurality of data sources associated with an automation environment; a software module detecting one or more events or one or more state changes in the data sources; a software module storing the detected events or state changes; a software module detecting synchrony in the detected events or state changes by performing operations comprising: identifying combinatorial pairs of data sources having an event or state change within a predetermined time window; and conducting pairwise testing for each identified combinatorial pair of data sources by applying an algorithm to the stored detected events or state changes; and a software module determining one or more relationships for at least one identified combinatorial pair of data sources.

Also described herein, in certain embodiments, are non-transitory computer-readable storage media encoded with instructions executable by one or more processors to provide an application comprising: a software module identifying a plurality of data sources associated with an automation environment; a software module detecting one or more events or one or more state changes in the data sources; a software module storing the detected events or state changes; a software module detecting synchrony in the detected events or state changes by performing operations comprising: identifying combinatorial pairs of data sources having an event or state change within a predetermined time window; and conducting pairwise testing for each identified combinatorial pair of data sources by applying an algorithm to the stored detected events or state changes; and a software module determining one or more relationships for at least one identified combinatorial pair of data sources.

Certain Definitions

Unless otherwise defined, all technical terms used herein have the same meaning as commonly understood by one of ordinary skill in the art to which the present subject matter belongs.

As used in this specification and the appended claims, the singular forms "a," "an," and "the" include plural references unless the context clearly dictates otherwise. Any reference to "or" herein is intended to encompass "and/or" unless otherwise stated.

As used herein, the "Internet of Things" or "IoT" refers to the network of physical devices, buildings, vehicles, and other objects that feature an IP address for internet network connectivity for exchanging data, wherein the network comprises, for example, ethernet, IP, serial buses, and/or other forms of communication between two or more IoT devices.

Reference throughout this specification to "some embodiments," "further embodiments," or "a particular embodiment," means that a particular feature, structure, or characteristic described in connection with the embodiment is included in at least one embodiment. Thus, the appearances of the phrase "in some embodiments," or "in further embodiments," or "in a particular embodiment" in various places throughout this specification are not necessarily all referring to the same embodiment. Furthermore, the particular structures, features, or characteristics may be combined in any suitable manner in one or more embodiments.

Automation Environment

In some embodiments, the platforms, systems, and methods described herein are implemented in relation to an automation environment. In further embodiments, the automation environment comprises electronically controllable equipment with one or more sensors, one or more actuators, and/or one or more effectors, as well as one or more automation controllers—either centralized and/or distributed. As this environment is the target of the logic and functionality described herein, the environment, in some cases, exists before the platforms, systems, and methods described herein are applied to it. In other cases, the environment is implemented with, e.g., proximate in time to, the platforms, systems, and methods described herein.

Many automation environments are suitable, including, by way of non-limiting examples, industrial environments, such as manufacturing environments and assembly environments, infrastructure, transportation, freight or shipping environments, smart cities, agricultural environments, military environments, law enforcement environments, commercial environments, such as smart building environments, smart office environments, healthcare environments, and retail environments, as well as residential environments, such as smart home environments, and the like. In some embodiments, the automation environments include cloud storage and/or computing system.

In various embodiments, the electronically controllable equipment comprises, by way of non-limiting examples, a smart manufacturing device (e.g., a robot, manufacturing actuator, assembly line sensor, etc.), a utility device (e.g., a water meter, transformer, gas meter, etc.), pipeline monitoring device, power plant monitoring device, electrical grid monitoring device, an environmental sensor (e.g., a carbon dioxide sensor, pollution detector, salinity meter, light meter, etc.), a weather sensor (e.g., humidity sensor, temperature sensor, rain gauge, anemometer, barometer, etc.), a transportation asset (e.g., a car, truck, watercraft, train, bus, aircraft, unmanned vehicle, GPS receiver, etc.), a freight or shipping asset (e.g., a shipping container, cargo, truck, rail car, watercraft, aircraft, etc.), a smart city device (e.g., a parking meter, utility meter, lighting device, traffic monitoring camera, emergency calling device, etc.), an agriculture device (e.g., a farming machine, soil sensor, irrigation device, etc.), a homeland security device (e.g., a body scanner, metal detector, radiation detector, biological agent detector, weapon, vehicle, drone, perimeter intrusion detector, gunfire locator, breathalyzer, etc.), a smart office device (e.g., an access control device, security system, HVAC system, vertical lifts, fire safety system, lighting system, printer, coffee maker, etc.), a point-of-sale (PoS) system (e.g., a payment device, receipt printer, barcode or QR code scanner, etc.), a health care device (e.g., a drug infusion pump, pacemaker, defibrillator, patient health monitoring device, etc.), as well as a smart home device (e.g., a security system, door lock, lighting device, appliance, thermostat, smoke detector, virtual assistant, smart speaker, etc.), and the like.

Data Sources

As described herein, in some embodiments, the automation environment comprises one or more pieces of electronically controllable equipment. In further embodiments, the electronically controllable equipment further comprises one or more of the following components: a microcontroller (MCU), a microprocessor (MPU), a memory or storage component, firmware, software, a networking/communications component, a sensing component (e.g., a sensor), an electronic circuit connected to the sensing component, an actuating component (e.g., an actuator and/or an effector), an electronic circuit connected to the actuating component, and an energy source. In some embodiments, one or more of the components are physically separate from a piece of electronically controllable equipment. In some embodiments, one or more of the components are integrated with, or embedded in, a piece of electronically controllable equipment.

In some embodiments, the automation environment comprises one or more cloud storage and/or computing systems, which in some cases are located remotely from the data integration pipeline. For example, some devices (e.g., pieces of electronically controllable equipment) are configured to communicate with a cloud storage and/or computing system. In these embodiments, the data integration pipeline discovers and/or extracts data from cloud APIs. In some embodiments, the data integration pipeline processes data both from on-premise systems and cloud systems.

In some embodiments, the networking/communication element includes a receiver, a transmitter, and/or a transceiver. In further embodiments, the networking/communication element comprises a radio frequency (RF) transceiver with an antenna or connection for an external antenna. Suitable transceivers include, by way of non-limiting examples, a Wi-Fi transceiver, a cellular transceiver, a Bluetooth transceiver, and the like.

In some embodiments, the electronically controllable equipment, or components thereof, comprises an IP address for internet connectivity. In further embodiments, the equipment may be associated with a MAC address or an SSID. It is understood that equipment may connect with other devices through wired or wireless connections, which allow for transfer (e.g., transmission, reception, or both) of data.

In some embodiments, the automation environment comprises one or more networks via which the electronically controllable equipment, or components thereof, sends and/or receives data. In various embodiments, the network comprises ethernet, IP, serial buses, and other forms of communication between two or more IoT devices. In further embodiments, the one or more networks comprise one or more IoT networks, one or more data packet-switched networks, one or more wireless sensor networks (WSN), and/or one or more wireless sensor and actuator networks (WSAN). In various embodiments, a network described herein is wireless network utilizing Wi-Fi, WiMAX, ZigBee, Z-Wave, Bluetooth, Bluetooth Low Energy (BLE), Near-Field Communication (NFC), or Light-Fidelity (Li-Fi). In some embodiments, a network described herein is wireless network utilizing LTE or 5G. In some embodiments, a network described herein is wireless network utilizing a low-power wide-area network (LPWAN) protocol, such as LoRa. In other embodiments, a network described herein is wired network utilizing Ethernet, serial, RS422 or RS485 serial bus, 1-Wire, CAN, DMX, or power line communication.

In some embodiments, one or more devices form nodes in the network. In some embodiments, a network described herein includes a central node for controlling the network. In some embodiments, the automation environment comprises electronically controllable equipment, or components there, that have hierarchical relationships, such as a controller/controlled relationship, a master/slave relationship, or the like. In some embodiments, a network described herein has a distributed architecture to reduce the impact of a failed device or node. In some embodiments, a network described herein consists of a peer-to-peer relationship between two or more devices.

The automation environment suitably comprises a wide range of numbers of data sources, including, by way of examples, pieces of electronically controllable equipment, local and remote data stores, and remote cloud computing services/resources, including APIs to provide data from remote computing services/resources. In various embodiments, the automation environment suitably comprises, by way of non-limiting examples, at least 5, at least 10, at least 50, at least 100, at least 500, at least 1,000, at least 5,000, at least 10,000, at least 50,000, or at least 100,000 data sources, including increments therein. In various further embodiments, the automation environment suitably comprises, by way of non-limiting examples, at least 500,000, at least 1,000,000, at least 5,000,000, at least 10,000,000, at least 50,000,000, at least 100,000,000, or at least 500,000,000 data sources, including increments therein.

In some embodiments, the automation environment comprises an automation controller, either centralized or distributed. For example, in some embodiments, the automation environment comprises one or more programmable logic controllers (PLC). A PLC is a microprocessor-based controller with programmable memory used to store program instructions and functions. In some embodiments, one or more of the PLCs are ruggedized. In various embodiments, a PLC comprises a processor unit (MCU or the MPU) which interprets inputs, executes the control program stored in memory, and sends output signals, a power supply unit which, in some cases, converts AC voltage to DC, a memory unit storing data from inputs and program instructions to be executed by the processor unit, an input and output interface, by which the PLC sends data to external devices and receives data from external devices, and a communications interface to receive and transmit data on communication networks. In further embodiments, a PLC comprises a real-time operating system, such as OS-9, Sedona, Niagara, or VxWorks. In various embodiments, PLC functionality includes, by way of examples, sequential relay control, motion control, process control, distributed control systems, and networking. In particular embodiments, a PLC is programmed with a device used to develop and later download a program into the memory of the PLC. The programming device, in various cases, includes a desktop console, special software on a personal computer, or a handheld programming device. In some cases, the program is downloaded to the PLC directly or over a network and stored either in non-volatile flash memory or battery-backed-up RAM.

In some embodiments, the MCU or the MPU receives data from a sensing component and transmits the data to the transmitter or transceiver to be transmitted to other remotely located elements within a network. In some embodiments, the receiver or transceiver receives data, for example, control data from remotely located devices, and such data gets relayed to the MCU or the MPU to generate commands to one or more other components. In such embodiments, a sensing component and/or an actuation component performs one or more functions(s) based on the received command. In some embodiments, an electrical circuit is utilized in data transfer among a sensing component, an actuation component, the MCU or MPU, and the networking/communications element.

Many sensors are suitable including, by way of non-limiting examples, GPS receivers, wearable sensors, mobile sensors, fixed sensors, and the like. In various embodiments, the electronically controllable equipment, or components thereof, and/or networks described herein comprise one or more of: an audio/acoustic sensor, a breathalyzer, a temperature sensor, a carbon dioxide sensor, a carbon monoxide sensor, an infrared sensor, an oxygen sensor, an ozone monitor, a pH sensor, a smoke detector, an electrical current sensor, an electrical voltage detector, a magnetometer, a metal detector, a radio direction finder, an air flow meter, an anemometer, a flow sensor, a gas meter, a water meter, a Geiger counter, an altimeter, an air speed indicator, a depth gauge, a gyroscope, a compass, an odometer, a shock detector, a barometer, a pressure gauge, a thermometer, a proximity sensor, a motion detector, an occupancy sensor, an inertial sensor, a gyroscope, or any combination thereof, and in some embodiments, sensor data comprises information obtained from any of the sensors described herein. Other examples of sensors include, but are not limited to, location sensors, vision sensors (e.g., imaging devices capable of detecting visible, infrared, or ultraviolet light, such as cameras, etc.), proximity sensors (e.g., ultrasonic sensors, LiDAR, time-of-flight cameras, etc.), inertial sensors (e.g., accelerometers, gyroscopes, inertial measurement units (IMUs), etc.), and field sensors (e.g., magnetometers, electromagnetic sensors, etc.). In particular embodiments, one or more sensors are configured to measure health parameters such as heart rate, pulse, electric signals from the heart, blood oxygen levels, blood pressure, blood sugar level, and the like. In particular embodiments, one or more sensors are configured to measure environmental parameters such as light, motion, temperature, pressure, humidity, vibration, magnetic field, sound, smoke, carbon monoxide, radiation, hazardous chemicals, acid, base, reactive compounds, volatile organic compounds, smog, and the like.

Any suitable number and combination of sensors can be used, such as one, two, three, four, five, or more sensors. Optionally, the data can be received from sensors of different types (e.g., two, three, four, five, or more types). Sensors of different types may measure different types of signals or information and/or utilize different types of measurement techniques to obtain data. For instance, the sensors may include any suitable combination of active sensors (e.g., sensors that generate and measure energy from their own source) and passive sensors (e.g., sensors that detect available energy).

Suitable actuators include, by way of non-limiting examples, electric (e.g., a motor, servo, solenoid, piezoelectric actuator, etc.), hydraulic, pneumatic (e.g., vacuum- or compressed gas-based actuators), magnetic, thermal (e.g., shape memory alloy-based actuators), soft, and mechanical actuators.

Suitable effectors include, by way of non-limiting examples, impactive, ingressive, astrictive, and contigutive effectors.

Overview of Exemplary Embodiments

The platforms, systems, and methods described herein interact with an automation environment and are implemented with multiple suitable architectures. Non-limiting examples are provided herein.

Referring to FIG. 1, in a particular embodiment, the platforms and systems 100 include, and methods utilize, an automation environment 110, a data source discovery/identification 120, an event detection module 130, a synchrony detection module 140, a machine learning module 150, a relationships determination module 160, and a database 170. The machine learning module 150 may be a standalone component, or it can be part of other components (e.g., synchrony detection module 140, relationship determination module 160, etc.).

Figure 2:
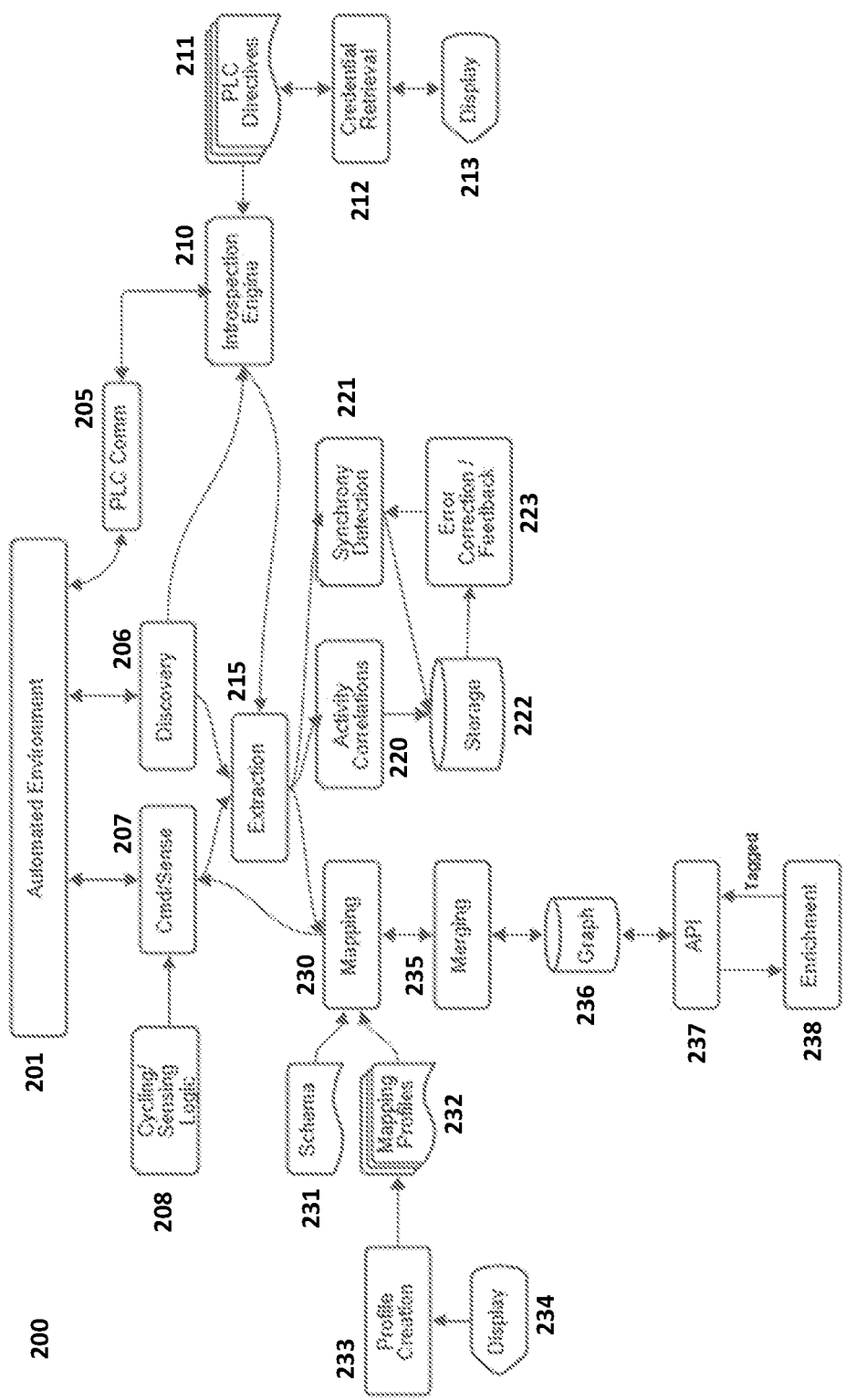
FIG. 2 shows a non-limiting example of a schematic diagram; in this case, a schematic diagram illustrating overall architecture and procedural aspects of the platforms, systems, and methods described herein.

Referring to FIG. 2, in a particular embodiment, the overall platforms and systems 200 are implemented in relation to an automation environment 201, and the methods utilize the automation environment 201. In this embodiment, a discovery module 206 and a command/sense module 207 interact directly with the automation environment 201 to conduct protocols to gain data about the environment and feed the data to an extraction module 215. The discovery module 206 provides data to an introspection engine 210, which communicates with a PLC communications module 205. In this embodiment, the introspection engine 210 receives one or more PLC directives 211, which may require credential retrieval 212 and presentation of an interface for showing credentials on a display 213 and/or receiving credentials, and the introspection engine 210 sends the PLC directives 211 to the PLC communications module 205 for issuance into the automation environment 201. Further, in this embodiment, a cycling/sensing logic module 208 provides instruction to the command/sense module 207 for interaction with the automation environment 201.

Continuing to refer to FIG. 2, in this particular embodiment, the command/sense module 207, the discovery module 206, and the introspection engine 210 provide data to the extraction module 215. In this embodiment, the extraction module 215 provides data to the activity correlations module 220 and the synchrony detection module 221, which are in communication with a storage module 222 and an error correction and feedback mechanism 223. In this embodiment, the extraction module 215 also provides data to the mapping module 230. By way of example, the mapping module 230 receives a mapping schema 231 and one or more mapping profiles 232, which may require profile creation 233 and presentation of an interface for showing profiles on a display 234 and/or receiving profiles. The mapping module 230 utilizes the schema 231 and the one or more profiles 232 to map the data extracted by the extraction module 215 and communicates the output to a merging module 235. Finally, in this embodiment, the merging module 235 is in communication with a graph database 236. An enrichment module 238 provides data enrichments, such as tagging (e.g., origin tagging, etc.), and access to the graph database 236 and the enrichments is provided via one or more APIs 237.

Figure 3:
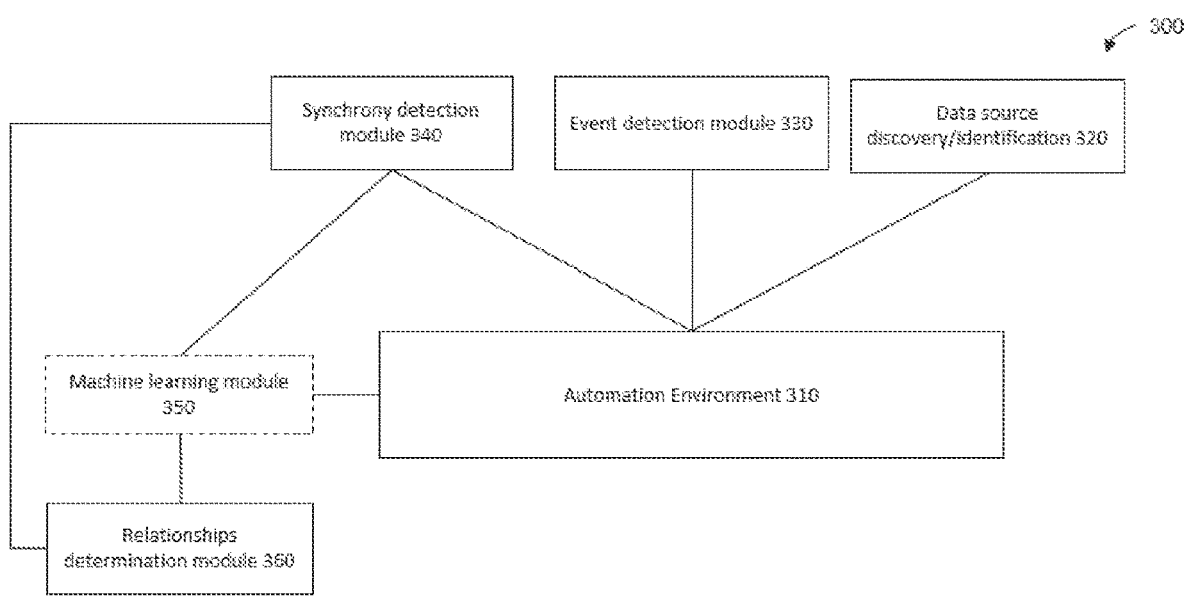
FIG. 3 shows a non-limiting example of a schematic diagram; in this case, a schematic diagram illustrating architecture and procedural aspects of the platforms, systems, and methods for discovering relationships among equipment through observation over time according to embodiments described herein.

Referring to FIG. 3, in a particular embodiment, the discovery of relationships among equipment through observation over time 300 is implemented in relation to an automation environment 310, and the methods utilize the automation environment 310. In this embodiment, a data source discovery/identification module 320 interact with the automation environment 310 to conduct protocols to gain data about the environment and to identify data sources in the automation environment 310. An event detection module 330 interact with the automation environment 310 and detect events or state changes of one or more identified data sources. The synchrony detection module 340 interacts with the automation environment 310 and detects synchrony in the detected events or state changes of the data sources in the automation environment 310. In some embodiments, the synchrony detection module 340 interacts directly with event detection module 330 and detects synchrony in the detected events or state changes of the data sources in the automation environment 310. In some embodiments, the synchrony detection module 340 identifies combinatorial pairs in the one or more identified data sources that having an event or state change within a time window, and then conducts pairwise testing for each of the identified combinatorial pairs of data sources. The pairwise testing conducted by the synchrony detection module 340 may utilize machine learning algorithms that provided by the machine learning module 350. The synchrony detection module 340 may interact directly with the relationships determination module 360 to determine one or more relationships for the identified combinatorial pair of data sources, wherein the relationships determination module 360 may inquire the machine learning module 350 for suitable machine learning algorithms or subset.

Figure 4:
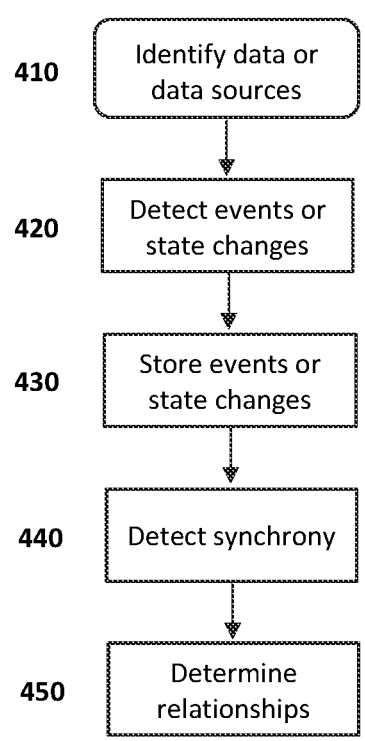
FIG. 4 shows a non-limiting example of a process flow diagram; in this case, a process flow diagram illustrating a discovery, state change detecting, synchrony detection, and relationship determination process according to embodiments described herein.

Referring to FIG. 4, in a particular embodiment, in a particular embodiment, a process for discovery of relationships among equipment through observation over time 400 begins with identifying one or more data and/or data sources 410. Identifying data sources associated with the automation environment, in this embodiment, comprises one or more of passive discovery, active discovery, and target interrogation methodologies. The identified data or data sources may include data files, data shares, data repositories, or controllers, hubs, IoT devices, sensors, actuators, and the like. The next step is to detect 420 events or state changes in the identified data sources. The detecting of events or state changes comprises passive inspection of packets or payloads on an automation controlled network associated with the automation environment. In some other embodiments, the detecting of events or state changes comprises inspection of communications in accordance with a communication protocol (e.g., S7, BACnet, KNX, or a combination thereof). In further embodiments, the detecting of events or state changes comprises monitoring the automation environment for a predefined monitoring period, substantially continuously, or continuously. The detecting of events or state changes may be performed by a gateway, a slave controller, or a computing device in communication with the automation environment directly, indirectly, via a cloud service, or any combination thereof.

The process 400 proceeds to store the detected events or state changes in a database (e.g., a timeseries database or a graph database). The database may comprise a stream of events or state changes for each of the identified data sources, associated with timestamps respectively. Next, the process 400 proceeds to detect synchrony 440 in the detected events or state changes by identifying combinatorial pairs of data sources having an event or state change within a predetermined time window and conducting pairwise testing for each identified combinatorial pair of data sources by applying an algorithm to the stored detected events or state changes. The algorithm comprises one or more of the following: Pearson correlation, Time Lagged Cross Correlation (TLCC), Windowed TLCC, Dynamic Time Warping (DTW), and Instantaneous Phase Synchrony. Alternatively or additionally, the algorithm comprises a machine learning model, wherein the machine learning model comprises one or more of the following: one or more neural networks, one or more deep neural networks, one or more support vector machines (SVM), one or more Bayesian models, linear regression, logistic regression, or k-means clustering. The process 400 then process to determine 450 one or more relationships for at least one identified combinatorial pair of data sources. The relationships comprise: one or more explicitly defined relationships, one or more transitive relationships, one or more implicit relationships, one or more geospatial relationships, or a combination thereof.

Data or Data Source Discovery Mechanism

One component of the platforms and systems described herein, and utilized by the methods described herein is the data or data source discovery mechanism. See, e.g., FIG. 1 at 120, FIG. 2 at 206, and FIG. 3 at 320. This will vary based on the environment the system is targeting but, in various embodiments, includes one or more of: passive discovery, active discovery, and target interrogation. Passive discovery is typically done by observing network traffic, whether IP, serial, or otherwise, between the potential data sources. When a known protocol is used, the origin and destination are recorded as a potential data source. Active discovery is usually protocol specific, but can range from "whois" commands in protocols like BACnet to IP subnet and port scanning for IP based systems. Again, when a device is found that speaks a desired protocol, it is recorded as a potential data source. Lastly, target interrogation includes actively speaking one or more protocols to a potential target to obtain additional information. In general, a known or discovered device is interrogated to find out about other known devices—and when more devices are found, they are similarly interrogated. Additionally, data sources can also be found in file shares or be manually entered, such as a cloud service.

A particular exemplary methodology for target interrogation is found in U.S. patent application Ser. No. 17/372,275, entitled SUBTENDED DEVICE MAPPING THROUGH CONTROLLER INTROSPECTION, filed on Jul. 9, 2021 and listing as inventors Shaun Cooley, Jose de Castro, and Jason Koh, which is hereby incorporated by reference in its entirety. This exemplary methodology utilizes communication methods set up for programming and configuration of controllers by human technicians. A collection of protocol specific PLC introspection directives is assembled. Each of these directives drives an introspection engine to reach in to the controller to obtain the necessary information. The engine obtains the make/model of a controller, finding the appropriate introspection directives, executing the sequence of commands, and then processing the final output. In this example, the data or data source discovery mechanism discovers devices that are subtended to a controller by masquerading as a human technician in order to obtain the controller's internal configuration and programming.

Data Extraction System

Another component of the platforms and systems described herein, and utilized by the methods described herein is the data extraction mechanism. See, e.g., FIG. 1 at 120, FIG. 2 at 215, and FIG. 3 at 320. After the data or data source discovery mechanism produces a list of potential data sources, the data extraction component is responsible for extracting data from each data source. This is done by leveraging the native protocol, such as BACnet, modbus, S7, or other automation protocol that the source is able to speak or respond on, or the file format if pulling data from a file, such as a CSV. In various embodiments, data is retrieved on a schedule, in response to an event, as a result of passively observing communications among data sources, or pushed from the source directly to this extraction component, or some combination of these. As this component receives data, it actively forwards it to other mechanism, such as the mapping mechanism, which typically transits a network. In preferred embodiments, the receiving end of this data would store the data in its raw form so that the raw data could be replayed in to the system if any of the subsequent components are improved after the data's initial pass through the system.

Mechanism for Detecting Events

Another component of the platforms and systems described herein, and utilized by the methods described herein is events or state changes detection mechanism. See, e.g., FIG. 1 at 130, FIG. 2 at 207, and FIG. 3 at 330. The events or state changes detection mechanism detects events or state changes associated with each data source in the automation environment. In some embodiments, the events or state changes detection component retrieves state change data previously stored in database 170. In some embodiments, the events detection component detects events or state changes through passive inspection of packets or payloads on an automation control network associated with the automation environment. For example, the events detection component may listen to packets or payloads on a network and then detect the state changes of the data sources. In some embodiments, the events detection component detects events or state changes through inspection of communications in accordance with a communication protocol, such as S7, BACnet, KNX, or a combination thereof. In some embodiments, the events detection component monitors the automation environment for a predefined monitoring period, substantially continuously, or continuously to detect events or state changes. In some embodiments, the events detection component detects events or state changes by a gateway, a slave controller, or a computing device in communication with the automation environment directly, indirectly, via a cloud service, or any combination thereof. Nowadays, a large number of data sources are cloud-based, with MQTT bridge or HTTP bridge to communicate with the cloud. In the cases when a data source (e.g., an IoT device) is a MQTT bridge device, the state of the IoT device may be monitored and detected by the platforms and systems of the present subject matter through the MQTT bridge. In particular, a message may be published to the device state MQTT topic, which may be associated with device ID. The database 170 may store or register this event changes in a registry, preferably associated with a timestamp. In the cases when a data source (e.g., an IoT device) is a HTPP bridge device, the state of the IoT device may be monitored and detected by the platforms and systems of the present subject matter through the HTPP bridge. For example, the IoT device may communicate with the platforms and systems of the present subject matter with a request to set state to a different value than the current value. Generally, the state data of a data source is in binary format. When there is a difference in data value or data structure between the state data and the configuration data (e.g., previously parameters associated with the data source), it is an indication of state change and will be registered in a registry, a database table, an index or the like for future use by the relationship determination mechanism. The detected events and state changes may be stored in a database 170 (e.g., timeseries database, relational database, graph database, or any combination thereof) as described in more details below.

Mechanism for Storing Detected Events and/or State Changes

Another component of the platforms and systems described herein, and utilized by the methods described herein is events or state changes storage mechanism. See, e.g., FIG. 1 at 170, FIG. 2 at 222. A simple relational database could be used by events or state changes storage mechanism. In another example, a combination of relational database and a time-series database may be used by the events or state changes storage mechanism. A time-series database may reflect the data changes of the data source overtime. Generally, a relational database enjoys the benefit of robust secondary index support, complex predicates, a rich query language, etc. However, when the data changes rapidly overtime, the volume of data can scale up enormously. Thus, it is preferable to have a separate time-series database works alongside the relational database to better store the events or state changes. In another preferred example, the events or state changes storage component utilizes a graph database to store the mapped data. A graph database is a database that uses graph structure for semantic queries with nodes (please note that "node" and "vertex" are used interchangeably in this application), edges, and properties to represent and store data. The data storage component (e.g., events or state changes storage mechanism) of the present subject matter provides a data structure wherein each vertex (node) in the graph also has a time-series store to capture state changes overtime. The time-series store may be a standalone database, or it can be defined as a property of the vertex (node). For example, the temperature data extracted from temperature sensor O at 8 PM on Jan. 27, 2021 may be stored in a graph database. The node in the graph may represent sensor O (which is a data source according to the present subject matter) and the value is 27° C. The timestamp 8 PM on Jan. 27, 2021 is stored as property for this node in the graph of the graph database. The time-series store may be associated with the nodes, and it may reflect the state changes overtime and provide a user with actionable insight. Subsequently, for example, the temperature data extracted from the same temperature sensor O at a later time, such as at 11 PM on Jan. 27, 2021 may be stored in the graph database. The same node in the graph still represents sensor O and the value is changed to 20° C. The timestamp 11 PM on Jan. 27, 2021 is stored as property for this node in the graph of the graph database. This constitute an event or state change associated with sensor O. These events or state changes associated with every IoT devices are observed by the present platforms and systems to determine relationships between data sources as described in more details below.

Mechanism for Detecting Synchrony

Another component of the platforms and systems described herein, and utilized by the methods described herein is synchrony detection mechanism. See, e.g., FIG. 1 at 140, FIG. 2 at 221, and FIG. 3 at 340. The synchrony detection mechanism identifies combinatorial pairs of data sources having an event or state change within a predetermined time window, and conducts pairwise testing by applying an algorithm to the stored detected events or state changes. In various embodiments, the algorithm comprises one or more of the following: Pearson correlation, Time Lagged Cross Correlation (TLCC), Windowed TLCC, Dynamic Time Warping (DTW), and Instantaneous Phase Synchrony. In further embodiments, the TLCC comprises a Granger causality test. In further embodiments, the Instantaneous Phase Synchrony comprises a Hilbert transform. The platforms or systems of the present subject matter identify a plurality of data sources (e.g., IoT devices), detect and store events and state changes associated with these data sources, as described above. These stored and detected events and state changes may be analyzed by the synchrony detection mechanism to identify the combinatorial pairs. Preferably, this analysis is performed on the events or state changes within a predetermined time window. For example, a temperature sensor O has an event change between 8 PM and 11 PM, wherein the value (representing the temperature) in the database drops from 27° C. to 20° C. During the same period of time, a HVAC system P is turned off (manually, or according to a preset schedule). This power down event of the HVAC system is previously detected and stored in the database as well. The synchrony detection mechanism may identify these two IoT devices as a potential combinatorial pair because of the synchrony between the state changes associated with temperature sensor O and HVAC system P during the same time window (i.e., 8 PM to 11 PM). Notice that there may be other factors affecting the temperature as well, the identified potential combinatorial pairs will be tested later with an algorithm to determine whether there is a true combinatorial pairing relationship between them. For example, a machine learning algorithm may perform a pairwise testing for each identified potential combinatorial pair. In some embodiments, the machine learning algorithm may closely monitor any events or state changes during another time window of a day, a week, a month, or a year. For example, in the above example related to the temperature sensor O and HVAC system P, it is possible that the HVAC system is located on the west side of a big facility, and the temperature sensor O is located on the east side of the facility. The temperature drop is because of the temperature drop between daytime and nighttime, or because of the power off of an assembly line near sensor O. The machine learning algorithm may perform pairwise testing for this pair of data source (i.e., temperature sensor O and HVAC system P) by monitor other events. If during another period of time that the HVAC system P is powered off for some reason, but the temperature sensor O's value (i.e., temperature) does not drop, then they are not a true combinatorial pair and should be de-linked in a database. If every time or almost every time when the HVAC system P is powered off (or turned down), there is corresponding value changes with temperature sensor O, then it is safe to conclude that they are a combinatorial pair. The machine learning (ML) algorithm may perform this type of pairwise testing automatically, once properly trained, for all the identified potential combinatorial pairs.

Mechanism for Determining Relationships

Another component of the platforms and systems described herein, and utilized by the methods described herein is relationships determination mechanism. See, e.g., FIG. 1 at 160, FIG. 3 at 360. The relationships determination mechanism determines relationships between data sources (e.g., combinatorial pairs) based on detected events or state changes. The relationships between the data sources comprises: one or more explicitly defined relationships, one or more transitive relationships, one or more implicit relationships, one or more geospatial relationships, or a combination thereof. In some embodiments, the relationship determination component may utilize different techniques to determine the relationships between different data sources, for example, data profiling or data visualization. A machine learning algorithm may be deployed to analyze data and determine the relationship between data sources. For example, a machine learning algorithm may extract metadata from the data source to understand field content. Further, the machine learning algorithm may inquiry the historical events or state changes that the platforms and systems have detected for the potential combinatorial pairs. These events or state changes may be input to the machine learning algorithm to identify a correlation between different data sources (e.g., relationship between IoT device A and IoT device B). Any determined relationships may be training examples that can be used to train the machine learning algorithm. For example, in the above example related to the temperature sensor O and HVAC system P, if the machine learning algorithm determines that the temperature sensor O and HVAC system P constitute a true combinatorial pair, and the HVAC system P affects the reading (i.e., value/temperature) of the temperature sensor O, then the relationship determination component determines that there is a relationship between these two data sources. This relationship is stored in a database to provide actionable insight. A relational database or a graph database may be used to store the determined relationship.

In the embodiments where a graph database is utilized, the relationship between different nodes (i.e., each node represents an IoT device) may be stored as edges between the nodes. For example, the relationship between the temperature sensor O and a lighting sensor R may be defined by the edge between them. The edge may provide important information to a user, for example, when the lights are on (as shown by the lighting sensor R) near the temperature sensor O, the temperature may increase because the light bulbs produce heat. As we know the heat produced by light bulbs is considered as waste. A user provided by the information represented by the edge between the lighting sensor R and temperature sensor O may analyze the energy waste produced by a certain brand/type of light bulbs and make the decision on whether it is cost-efficient to replace these light bulbs. Preferably, the edges in a graph database may represent the directionality between data sources, i.e., whether one data source's state change is the cause to the other data source's state change. This may be referred to as causality relationship. In some embodiments, the edges in a graph of the graph database are directed (i.e., has a direction from one node to the connecting node). In a directed graph, the edges connecting two nodes have different meanings, depending on their direction. For example, the direction from Node A (e.g., IoT device A) to Node B (e.g., IoT device B) may represent a causality relationship between the two nodes (i.e., IoT devices or data sources). As describe above, because the events or state changes associated with data sources are stored with time-series store in a database, the resulting data contains a living representation of the data rather than a static view of the data. In these operations, the evolved and evolving vertices (nodes) in the graph may provide both provenance and history associated with them, and thus provide actionable insights to management teams or other department to optimize facilities. With the determined relationships between nodes (e.g., data sources) stored as edges in the graph database, the present platforms and systems provides a user with a rich data presentation regarding the operations of IoT devices within a large facility or even between different facilities.

Mechanism for Error Correction Feedback

Another component of the platforms and systems described herein, and utilized by the methods described herein is error correction feedback mechanism. See, e.g., FIG. 2 at 223. As described above, the platforms and systems of the present subject matter provides a living representation of the data rather than a static view of the data, which enables a user to understand the meaning of the data. In some cases, a determined relationship between two data sources can be a relationship that does not make sense, and is the result of a pure coincidence. For example, a temperature sensor O's reading always drops by 5 degrees between 5 PM and 6 PM, and a HVAC system P located in a different facility is always turned off at 5 PM. Based on the reading of the events and state changes, the system may determine there is causal relationship between the temperature sensor O and the HVAC system P, wherein the Power off event of the HVAC system P is the cause of the dropping of the temperature sensor O's reading. However, if a user is presented with this relationship, he or she can quickly recognize that the HVAC system P should not have any meaningful relationship with temperature sensor O because they are not in the same facility. The user may then manually de-link the relationship between the two data sources in the graph database. This de-link operation may be facilitated by the error correction feedback component. In some embodiments, the error correction feedback component marks this de-link operation as a training example to feed to the machine learning algorithm. The machine learning algorithm may train itself with this operation. Overtime, the machine learning algorithm may understand that data sources from different facilities, even appear to be combinatorial pairs and have state changes corresponding to each other, may not be true combinatorial pairs and should not be assigned with a relationship between them. Further, the machine learning algorithm may train itself to detect errors by itself. In some embodiments, the error correction feedbacks may propagate throughout the entire platforms and system of the present subject matter, thus other potential errors may be flagged and detected. With the deployment of machine learning algorithm, the relationship determination component, and the error correction component, the platforms and systems of present subject matter may continuously evolve and provide even more accurate and effortless relationship determination operations.

Data Mapping Mechanism

Another component of the platforms and systems described herein, and utilized by the methods described herein is the data mapping mechanism. See, e.g., FIG. 2 at 230. The mapping mechanism is responsible for mapping data from the source format to an ontology, such as a strongly-typed ontology, used by subsequent components in the pipeline. This component optionally comprises a manually crafted set of mapping rules or logic (including those comprising one or more heuristics) to take a known input schema and produce an output schema, such as an XSLT file (Extensible Stylesheet Language Transformations) or even simple field mapping (A→7). In some embodiments, this mapping mechanism optionally comprises complex machine learning based transformation that is trained from interactive data transformation performed by humans or by the data integration pipeline, which improves over time. Example machine learning models include, by way of examples, regular or deep neural networks, support vector machines, Bayesian models, linear regression, logistic regression, k-means clustering, or the like.

A particular exemplary methodology for mapping and normalizing extracted data is found in U.S. patent application Ser. No. 17/372,256, entitled DATA MAPPING BASED ON DEVICE PROFILES, filed on Jul. 9, 2021 and listing as inventors Shaun Cooley, Jose de Castro, and Jason Koh, which is hereby incorporated by reference in its entirety. This exemplary methodology utilizes a data mapping mechanism positioned between the discovered devices and the target schema or ontology and is responsible for converting the data extracted from devices to the target ontology by applying device mapping profiles that were looked up in the storage and lookup system for device mapping profiles using the make/model/firmware or fingerprint of extracted from the device providing data.

Data Merging Method

Another component of the platforms and systems described herein, and utilized by the methods described herein is the data merging mechanism. See, e.g., FIG. 2 at 235. The data merging method takes data that has been mapped to the system's ontology by the mapping component and merges it into the data storage mechanism, described above. It is important that the mapped data is merged and not just simply loaded as the data storage mechanism contains a living representation of the data, the relationships among the data, and any enrichments that were introduced by subsequent components. Simply loading the data would introduce a static view of data that is incapable of evolving further and similarly wouldn't align with the enriched and evolved model. The merge process, in some embodiments, includes matching mapped source data with evolved vertices in the graph, which optionally involves knowing both provenance and history of each vertex in the graph. In further embodiments, once matched, any new properties, shape details, or relationships can be merged into the matched vertices and any timeseries data recorded in the vertex's timeseries store. At this point data is simultaneously available to API callers, stream destinations, and the enrichment mechanisms.

Data Enrichment Mechanism

Another component of the platforms and systems described herein, and utilized by the methods described herein is the data enrichment mechanism. See, e.g., FIG. 2 at 238. Data enrichment mechanisms watch the real-time stream of graph and timeseries data in order to enrich the graph by creating, updating, or deleting vertices, edges (relationships), or vertex/edge properties in the graph. In general, these enrichment mechanisms look for patterns in the graph, the timeseries, or both through mechanisms such as simple pattern matching, statistical analysis, machine learning, or even human processing.

A particular exemplary methodology for data enrichment is found in U.S. patent application Ser. No. 17/372,251, entitled GRAPH DATA ENRICHMENT, filed on Jul. 9, 2021 and listing as inventors Shaun Cooley, Jose de Castro, and Jason Koh, which is hereby incorporated by reference in its entirety. This exemplary methodology utilizes a mechanism to allow downstream processing of graph structure and data to feed back into the graph in order to benefit all other users of the graph through real-time enrichment of vertices, edges, and related data within the graph database. First, in this example, updates to the graph, timeseries data, or both are received, e.g., by scheduled polling of the graph or timeseries data through queries, polling of a changelog, or a real-time feed of changes in the graph or timeseries data being pushed to interested parties (local to the graph or remote). Second, in this example, data enrichments are produced, e.g., by one or more mechanisms in or out of band. In preferred embodiments, multiple instances of data enrichment mechanisms are each configured to produce a specific enrichment and receive graph or timeseries data updates and analyze the new state of the graph through rules based, heuristic, statistical, or machine learning based systems to determine if an enrichment should be created, updated, or deleted. Finally, in this example, enrichments are contributed back to the graph database, timeseries data, or both with origin tagging, e.g., by receiving a stream of vertex, edge, and property creation, update, and delete requests from the various instances of the data enrichment(s) components, and merging the deltas into the graph. In preferred embodiments, each delta merged into the graph is tagged with the identity of the enrichment component that created it (e.g., origin tagging) so that future updates or deletions can be properly applied, thus avoiding duplicate or abandoned elements in the graph.

Further examples of data enrichment are provided in U.S. patent application Ser. No. 17/372,238, entitled AUTOMATIC DISCOVERY OF RELATIONSHIPS AMONG EQUIPMENT THROUGH AUTOMATED CYCLING AND OBSERVATION, filed on Jul. 9, 2021 and listing as inventors Shaun Cooley, Jose de Castro, and Jason Koh, and U.S. patent application Ser. No. 17/372,267, entitled AUTOMATIC DISCOVERY OF AUTOMATED DIGITAL SYSTEMS THROUGH LINK SALIENCE, filed on Jul. 9, 2021 and listing as inventors Shaun Cooley, Jose de Castro, and Jason Koh, each of which are hereby incorporated by reference in its entirety.

APIs and Streams for Accessing the Normalized, Merged, and Enriched Data

Another component of the platforms and systems described herein, and utilized by the methods described herein is one or more APIs and/or real-time data streams and/or live data feeds. See, e.g., FIG. 2 at 237. The last component needed for the platforms, systems, and methods described herein is some combination of APIs and streams for accessing the normalized, merged, and enriched data. While this data pipeline adds immense value to the original raw data that entered the pipeline, the resulting data would be useless if it couldn't be accessed. In various embodiments, the final destination of the processed data is other applications, running either locally or remotely, that will access the data either by polling an API for new data or using a callback, webhook, or web socket type mechanism to receive a stream of data in real-time. These applications must also be aware of any enrichments that came into existence after the initial delivery of data, so all delivered data must be uniquely identifiable so subsequent updates can be correlated.

In a preferred embodiment, this pipeline can also process data in reverse to push changes that are made to the data storage system, by enrichment mechanisms or other users of the API, back through the merging and mapping component and in to the automation environment as commands.

Computing System

Figure 5:
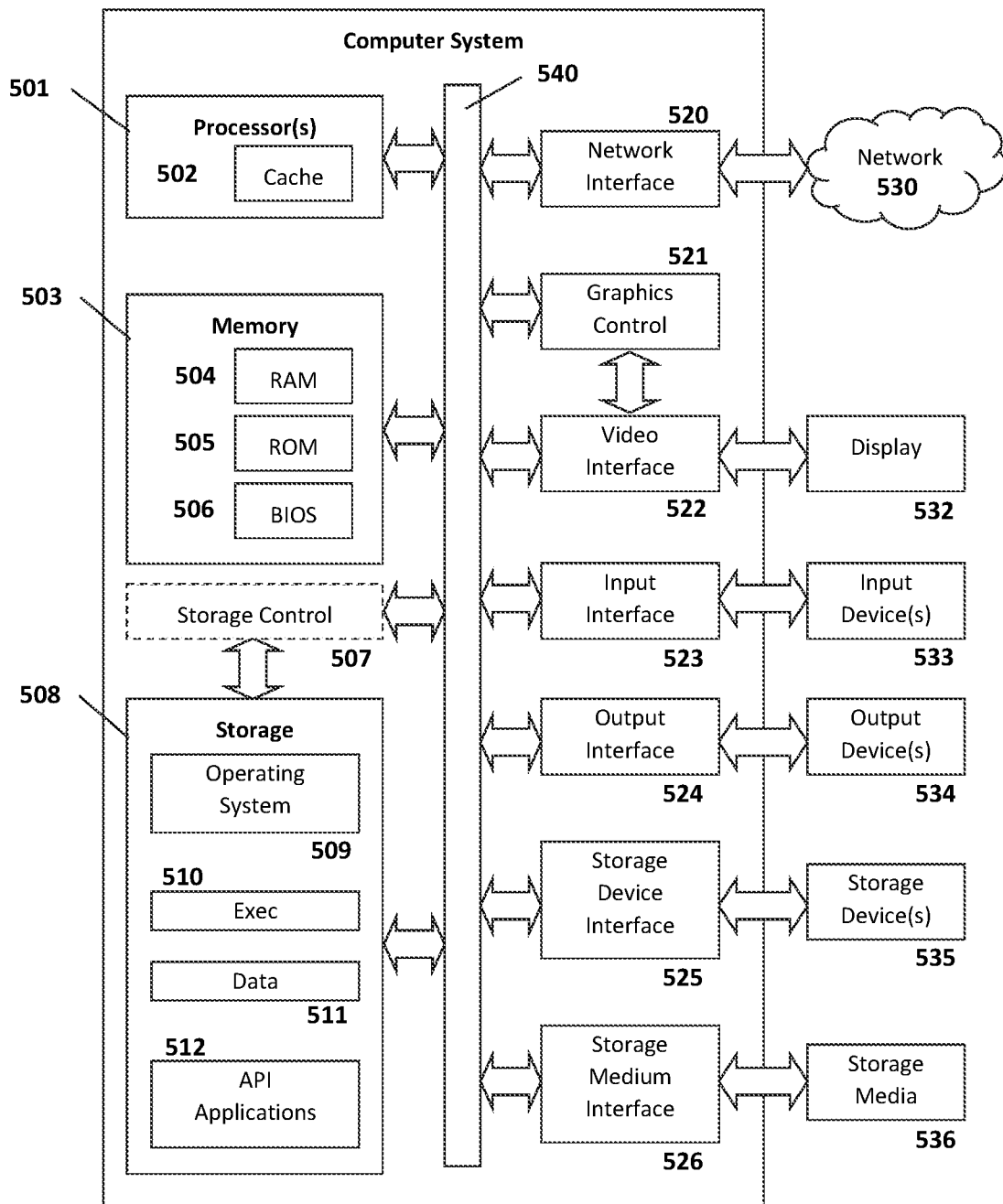
FIG. 5 shows a non-limiting example of a computing device; in this case, a device with one or more processors, memory, storage, and a network interface.

Referring to FIG. 5, a block diagram is shown depicting an exemplary machine that includes a computer system 500 (e.g., a processing or computing system) within which a set of instructions can execute for causing a device to perform or execute any one or more of the aspects and/or methodologies for static code scheduling of the present disclosure. The components in FIG. 5 are examples only and do not limit the scope of use or functionality of any hardware, software, embedded logic component, or a combination of two or more such components implementing particular embodiments.

Computer system 500 may include one or more processors 501, a memory 503, and a storage 508 that communicate with each other, and with other components, via a bus 540. The bus 540 may also link a display 532, one or more input devices 533 (which may, for example, include a keypad, a keyboard, a mouse, a stylus, etc.), one or more output devices 534, one or more storage devices 535, and various tangible storage media 536. All of these elements may interface directly or via one or more interfaces or adaptors to the bus 540. For instance, the various tangible storage media 536 can interface with the bus 540 via storage medium interface 526. Computer system 500 may have any suitable physical form, including but not limited to one or more integrated circuits (ICs), printed circuit boards (PCBs), mobile handheld devices (such as mobile telephones or PDAs), laptop or notebook computers, distributed computer systems, computing grids, or servers.

Computer system 500 includes one or more processor(s) 501 (e.g., central processing units (CPUs), general purpose graphics processing units (GPGPUs), or quantum processing units (QPUs)) that carry out functions. Processor(s) 501 optionally contains a cache memory unit 502 for temporary local storage of instructions, data, or computer addresses. Processor(s) 501 are configured to assist in execution of computer readable instructions. Computer system 500 may provide functionality for the components depicted in FIG. 5 as a result of the processor(s) 501 executing non-transitory, processor-executable instructions embodied in one or more tangible computer-readable storage media, such as memory 503, storage 508, storage devices 535, and/or storage medium 536. The computer-readable media may store software that implements particular embodiments, and processor(s) 501 may execute the software. Memory 503 may read the software from one or more other computer-readable media (such as mass storage device(s) 535, 536) or from one or more other sources through a suitable interface, such as network interface 520. The software may cause processor(s) 501 to carry out one or more processes or one or more steps of one or more processes described or illustrated herein. Carrying out such processes or steps may include defining data structures stored in memory 503 and modifying the data structures as directed by the software.

The memory 503 may include various components (e.g., machine readable media) including, but not limited to, a random access memory component (e.g., RAM 504) (e.g., static RAM (SRAM), dynamic RAM (DRAM), ferroelectric random access memory (FRAM), phase-change random access memory (PRAM), etc.), a read-only memory component (e.g., ROM 505), and any combinations thereof. ROM 505 may act to communicate data and instructions unidirectionally to processor(s) 501, and RAM 504 may act to communicate data and instructions bidirectionally with processor(s) 501. ROM 505 and RAM 504 may include any suitable tangible computer-readable media described below. In one example, a basic input/output system 506 (BIOS), including basic routines that help to transfer information between elements within computer system 500, such as during start-up, may be stored in the memory 503.

Fixed storage 508 is connected bidirectionally to processor(s) 501, optionally through storage control unit 507. Fixed storage 508 provides additional data storage capacity and may also include any suitable tangible computer-readable media described herein. Storage 508 may be used to store operating system 509, executable(s) 510, data 511, applications 512 (application programs), and the like. Storage 508 can also include an optical disk drive, a solid-state memory device (e.g., flash-based systems), or a combination of any of the above. Information in storage 508 may, in appropriate cases, be incorporated as virtual memory in memory 503.

In one example, storage device(s) 535 may be removably interfaced with computer system 500 (e.g., via an external port connector (not shown)) via a storage device interface 525. Particularly, storage device(s) 535 and an associated machine-readable medium may provide non-volatile and/or volatile storage of machine-readable instructions, data structures, program modules, and/or other data for the computer system 500. In one example, software may reside, completely or partially, within a machine-readable medium on storage device(s) 535. In another example, software may reside, completely or partially, within processor(s) 501.

Bus 540 connects a wide variety of subsystems. Herein, reference to a bus may encompass one or more digital signal lines serving a common function, where appropriate. Bus 540 may be any of several types of bus structures including, but not limited to, a memory bus, a memory controller, a peripheral bus, a local bus, and any combinations thereof, using any of a variety of bus architectures. As an example and not by way of limitation, such architectures include an Industry Standard Architecture (ISA) bus, an Enhanced ISA (EISA) bus, a Micro Channel Architecture (MCA) bus, a Video Electronics Standards Association local bus (VLB), a Peripheral Component Interconnect (PCI) bus, a PCI-Express (PCI-X) bus, an Accelerated Graphics Port (AGP) bus, HyperTransport (HTX) bus, serial advanced technology attachment (SATA) bus, and any combinations thereof.

Computer system 500 may also include an input device 533. In one example, a user of computer system 500 may enter commands and/or other information into computer system 500 via input device(s) 533. Examples of an input device(s) 533 include, but are not limited to, an alpha-numeric input device (e.g., a keyboard), a pointing device (e.g., a mouse or touchpad), a touchpad, a touch screen, a multi-touch screen, a joystick, a stylus, a gamepad, an audio input device (e.g., a microphone, a voice response system, etc.), an optical scanner, a video or still image capture device (e.g., a camera), and any combinations thereof. In some embodiments, the input device is a Kinect, Leap Motion, or the like. Input device(s) 533 may be interfaced to bus 540 via any of a variety of input interfaces 523 (e.g., input interface 523) including, but not limited to, serial, parallel, game port, USB, FIREWIRE, THUNDERBOLT, or any combination of the above.

In particular embodiments, when computer system 500 is connected to network 530, computer system 500 may communicate with other devices, specifically mobile devices and enterprise systems, distributed computing systems, cloud storage systems, cloud computing systems, and the like, connected to network 530. The network 530 may comprise ethernet, IP, serial buses, and other forms of communication between two or more IoT devices. Communications to and from computer system 500 may be sent through network interface 520. For example, network interface 520 may receive incoming communications (such as requests or responses from other devices) in the form of one or more packets (such as Internet Protocol (IP) packets) from network 530, and computer system 500 may store the incoming communications in memory 503 for processing. Computer system 500 may similarly store outgoing communications (such as requests or responses to other devices) in the form of one or more packets in memory 503 and communicated to network 530 from network interface 520. Processor(s) 501 may access these communication packets stored in memory 503 for processing.

Examples of the network interface 520 include, but are not limited to, a network interface card, a modem, and any combination thereof. Examples of a network 530 or network segment 530 include, but are not limited to, a distributed computing system, a cloud computing system, a wide area network (WAN) (e.g., the Internet, an enterprise network), a local area network (LAN) (e.g., a network associated with an office, a building, a campus or other relatively small geographic space), a telephone network, a direct connection between two computing devices, a peer-to-peer network, and any combinations thereof. A network, such as network 530, may employ a wired and/or a wireless mode of communication. In general, any network topology may be used.

Information and data can be displayed through a display 532. Examples of a display 532 include, but are not limited to, a cathode ray tube (CRT), a liquid crystal display (LCD), a thin film transistor liquid crystal display (TFT-LCD), an organic liquid crystal display (OLED) such as a passive-matrix OLED (PMOLED) or active-matrix OLED (AMOLED) display, a plasma display, and any combinations thereof. The display 532 can interface to the processor(s) 501, memory 503, and fixed storage 508, as well as other devices, such as input device(s) 533, via the bus 540. The display 532 is linked to the bus 540 via a video interface 522, and transport of data between the display 532 and the bus 540 can be controlled via the graphics control 521. In some embodiments, the display is a video projector. In some embodiments, the display is a head-mounted display (HMD) such as a VR headset. In further embodiments, suitable VR headsets include, by way of non-limiting examples, HTC Vive, Oculus Rift, Samsung Gear VR, Microsoft HoloLens, Razer OSVR, FOVE VR, Zeiss VR One, Avegant Glyph, Freefly VR headset, and the like. In still further embodiments, the display is a combination of devices such as those disclosed herein.

In addition to a display 532, computer system 500 may include one or more other peripheral output devices 534 including, but not limited to, an audio speaker, a printer, a storage device, and any combinations thereof. Such peripheral output devices may be connected to the bus 540 via an output interface 524. Examples of an output interface 524 include, but are not limited to, a serial port, a parallel connection, a USB port, a FIREWIRE port, a THUNDERBOLT port, and any combinations thereof.

In addition or as an alternative, computer system 500 may provide functionality as a result of logic hardwired or otherwise embodied in a circuit, which may operate in place of or together with software to execute one or more processes or one or more steps of one or more processes described or illustrated herein. Reference to software in this disclosure may encompass logic, and reference to logic may encompass software. Moreover, reference to a computer-readable medium may encompass a circuit (such as an IC)

storing software for execution, a circuit embodying logic for execution, or both, where appropriate. The present disclosure encompasses any suitable combination of hardware, software, or both.

Those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by one or more processor(s), or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In accordance with the description herein, suitable computing devices include, by way of non-limiting examples, server computers, desktop computers, laptop computers, notebook computers, sub-notebook computers, netbook computers, netpad computers, set-top computers, media streaming devices, handheld computers, Internet appliances, mobile smartphones, tablet computers, personal digital assistants, and vehicles.

In some embodiments, the computing device includes an operating system configured to perform executable instructions. The operating system is, for example, software, including programs and data, which manages the device's hardware and provides services for execution of applications. Those of skill in the art will recognize that suitable server operating systems include, by way of non-limiting examples, FreeBSD, OpenBSD, NetBSD®, Linux, Apple® Mac OS X Server®, Oracle® Solaris®, Windows Server®, and Novella® NetWare®. Those of skill in the art will recognize that suitable personal computer operating systems include, by way of non-limiting examples, Microsoft® Windows®, Apple® Mac OS X®, UNIX®, and UNIX-like operating systems such as GNU/Linux®. In some embodiments, the operating system is provided by cloud computing. Those of skill in the art will also recognize that suitable mobile smartphone operating systems include, by way of non-limiting examples, Nokia® Symbian® OS, Apple® iOS®, Research In Motion® BlackBerry OS®, Google® Android®, Microsoft® Windows Phone® OS, Microsoft® Windows Mobile® OS, Linux®, and Palm® WebOS®.

Non-Transitory Computer Readable Storage Medium

In some embodiments, the platforms, systems, media, and methods disclosed herein include one or more non-transitory computer readable storage media encoded with a program including instructions executable by the operating system of an optionally networked computing device. In further embodiments, a computer readable storage medium is a tangible component of a computing device. In still further embodiments, a computer readable storage medium is optionally removable from a computing device. In some embodiments, a computer readable storage medium includes, by way of non-limiting examples, CD-ROMs, DVDs, flash memory devices, solid state memory, magnetic disk drives, magnetic tape drives, optical disk drives, distributed computing systems including cloud computing systems and services, and the like. In some cases, the program and instructions are permanently, substantially permanently, semi-permanently, or non-transitorily encoded on the media.

Computer Program

In some embodiments, the platforms, systems, media, and methods disclosed herein include at least one computer program, or use of the same. A computer program includes a sequence of instructions, executable by one or more processor(s) of the computing device's CPU, written to perform a specified task. Computer readable instructions may be implemented as program modules, such as functions, objects, Application Programming Interfaces (APIs), computing data structures, and the like, that perform particular tasks or implement particular abstract data types. In light of the disclosure provided herein, those of skill in the art will recognize that a computer program may be written in various versions of various languages.

The functionality of the computer readable instructions may be combined or distributed as desired in various environments. In some embodiments, a computer program comprises one sequence of instructions. In some embodiments, a computer program comprises a plurality of sequences of instructions. In some embodiments, a computer program is provided from one location. In other embodiments, a computer program is provided from a plurality of locations. In various embodiments, a computer program includes one or more software modules. In various embodiments, a computer program includes, in part or in whole, one or more web applications, one or more mobile applications, one or more standalone applications, or combinations thereof.

Web Application

In some embodiments, a computer program includes a web application. In light of the disclosure provided herein, those of skill in the art will recognize that a web application, in various embodiments, utilizes one or more software frameworks and one or more database systems. In some embodiments, a web application is created upon a software framework such as Microsoft® .NET or Ruby on Rails (RoR). In some embodiments, a web application utilizes one or more database systems including, by way of non-limiting examples, relational, non-relational, object oriented, associative, XML, and document oriented database systems. In further embodiments, suitable relational database systems include, by way of non-limiting examples, Microsoft® SQL Server, mySQL™, and Oracle®. Those of skill in the art will also recognize that a web application, in various embodiments, is written in one or more versions of one or more languages. A web application may be written in one or more markup languages, presentation definition languages, client-side scripting languages, server-side coding languages, database query languages, or combinations thereof. In some embodiments, a web application is written to some extent in a markup language such as Hypertext Markup Language (HTML), Extensible Hypertext Markup Language (XHTML), or eXtensible Markup Language (XML). In some embodiments, a web application is written to some extent in a presentation definition language such as Cascading Style Sheets (CSS). In some embodiments, a web application is written to some extent in a client-side scripting language such as Asynchronous JavaScript and XML (AJAX), Flash® ActionScript, JavaScript, or Silverlight®. In some embodiments, a web application is written to some extent in a server-side coding language such as Active Server Pages (ASP), ColdFusion, Perl, Java™, JavaServer Pages (JSP), Hypertext Preprocessor (PHP), Python™, Ruby, Tcl, Smalltalk, WebDNA®, or Groovy. In some embodiments, a web application is written to some extent in a database query language such as Structured Query Language (SQL). In some embodiments, a web application integrates enterprise server products such as IBM® Lotus Domino®. In some embodiments, a web application includes a media player element. In various further embodiments, a media player element utilizes one or more of many suitable multimedia technologies including, by way of non-limiting examples, Adobe® Flash® HTML 5, Apple® QuickTime®, Microsoft® Silverlight®, Java™, and Unity®.

Mobile Application

In some embodiments, a computer program includes a mobile application provided to a mobile computing device. In some embodiments, the mobile application is provided to a mobile computing device at the time it is manufactured. In other embodiments, the mobile application is provided to a mobile computing device via the computer network described herein.

In view of the disclosure provided herein, a mobile application is created by techniques known to those of skill in the art using hardware, languages, and development environments known to the art. Those of skill in the art will recognize that mobile applications are written in several languages. Suitable programming languages include, by way of non-limiting examples, C, C++, C#, Objective-C, Java™, JavaScript, Pascal, Object Pascal, Python™, Ruby, VB.NET, WML, and XHTML/HTML with or without CSS, or combinations thereof.

Suitable mobile application development environments are available from several sources. Commercially available development environments include, by way of non-limiting examples, AirplaySDK, alcheMo, Appcelerator®, Celsius, Bedrock, Flash Lite, .NET Compact Framework, Rhomobile, and WorkLight Mobile Platform. Other development environments are available without cost including, by way of non-limiting examples, Lazarus, MobiFlex, MoSync, and Phonegap. Also, mobile device manufacturers distribute software developer kits including, by way of non-limiting examples, iPhone and iPad (iOS) SDK, Android™ SDK, BlackBerry® SDK, BREW SDK, Palm® OS SDK, Symbian SDK, webOS SDK, and Windows® Mobile SDK.

Standalone Application

In some embodiments, a computer program includes a standalone application, which is a program that is run as an independent computer process, not an add-on to an existing process, e.g., not a plug-in. Those of skill in the art will recognize that standalone applications are often compiled. A compiler is a computer program(s) that transforms source code written in a programming language into binary object code such as assembly language or machine code. Suitable compiled programming languages include, by way of non-limiting examples, C, C++, Objective-C, COBOL, Delphi, Eiffel, Java™, Lisp, Python™, Visual Basic, and VB .NET, or combinations thereof. Compilation is often performed, at least in part, to create an executable program. In some embodiments, a computer program includes one or more executable complied applications.

Software Modules

In some embodiments, the platforms, systems, media, and methods disclosed herein include software, server, and/or database modules, or use of the same. In view of the disclosure provided herein, software modules are created by techniques known to those of skill in the art using machines, software, and languages known to the art. The software modules disclosed herein are implemented in a multitude of ways. In various embodiments, a software module comprises a file, a section of code, a programming object, a programming structure, a distributed computing resource, a cloud computing resource, or combinations thereof. In further various embodiments, a software module comprises a plurality of files, a plurality of sections of code, a plurality of programming objects, a plurality of programming structures, a plurality of distributed computing resources, a plurality of cloud computing resources, or combinations thereof. In various embodiments, the one or more software modules comprise, by way of non-limiting examples, a web application, a mobile application, a standalone application, and a cloud computing application. In some embodiments, software modules are in one computer program or application. In other embodiments, software modules are in more than one computer program or application. In some embodiments, software modules are hosted on one machine. In other embodiments, software modules are hosted on more than one machine. In further embodiments, software modules are hosted on a distributed computing platform such as a cloud computing platform. In some embodiments, software modules are hosted on one or more machines in one location. In other embodiments, software modules are hosted on one or more machines in more than one location.

Databases

In some embodiments, the platforms, systems, media, and methods disclosed herein include one or more databases, or use of the same. In view of the disclosure provided herein, those of skill in the art will recognize that many databases are suitable for storage and retrieval of, for example, automation environment information, data source information, event information, state change information, combinatorial pair information, algorithm information, and relationship information. In various embodiments, suitable databases include, by way of non-limiting examples, relational databases, non-relational databases, object oriented databases, object databases, entity-relationship model databases, associative databases, XML databases, document oriented databases, and graph databases. Further non-limiting examples include SQL, PostgreSQL, MySQL, Oracle, DB2, Sybase, MongoDB, and the like. Suitable graph databases include, by way of non-limiting examples, ArangoDB, AnzoGraph DB, JanusGraph, Neo4j, Sparksee, Sqrrl Enterprise, and the like. In some embodiments, a database is Internet-based. In further embodiments, a database is web-based. In still further embodiments, a database is cloud computing-based. In a particular embodiment, a database is a distributed database. In other embodiments, a database is based on one or more local computer storage devices.

EXAMPLES

The following illustrative examples are representative of embodiments of the software applications, systems, and methods described herein and are not meant to be limiting in any way.

Example—Use Case

In one of use cases, Company A buys a Factory B, or Company A is looking to integrate data of an existing facility Factory B with another set of data (e.g., data from a Warehouse C also owned by Company A) to provide better visibility of the operation of Factory B and/or Warehouse C. In many instances, Factory B and Warehouse C may include a number of pieces of equipment that are connected to the internet that facture an IP address, i.e., IoT devices. IoT devices often interact with each other and generate huge volumes of data. This data has the potential of providing invaluable information to the operators of Factory B and Warehouse C, and the management team of Company A. However, if the accumulated data associated with IoT devices is generated across a long period of time according to different standards by different service providers, it is quite possible that the data is not in a format that is readily understandable by Company A, and thus cannot provide actionable insight for Company A. For example, the data format may be in a proprietary format that is not useful for people in Company A to understand the operation of Factory B.

Further, the interactions and the underlying relationships between different IoT devices provide invaluable information to users. For example, in a smart home setting, a voice-activated assistant may react to voice commands of "turn on the kitchen light" and then automatically turn on the lights in the kitchen. Although this kind of interactions are apparent and can be easily recognized, a variety of underlying relationships between IoT devices are not easily recognizable. For example, suppose a facility is featured with four HVAC systems because of the big size of the facility (e.g., a big factory, a school building, etc.), a temperature sensor located on the west side of the facility may reflect the effectiveness of a nearby HVAC system in terms of providing heating and cooling; and an air quality sensor may reflect the effectiveness of the HVAC system in terms of the ventilation. Solely viewing the data from the temperature sensor and the air quality sensor, a user may not immediately recognize which HVAC system the data is targeting. In addition, due to the big size of the facility, there may be a large quantity of temperature sensors and air quality sensors, and thus there exists a large quantity of data streams associated with each of the temperature sensor and air quality sensors. Because it is hard to recognize what information these streams of data provides (i.e., which other IoT devices are associated with each stream of data, meaning the relationships between IoT devices), the data can be useless to the data owners. To make things worse, some companies may own a number of facilities and each of these facilities may features with a large quantity of IoT devices. The relationships between IoT devices across different facilities are also hard to recognize and thus the data associated with these IoT devices provides little use to the data owners (e.g., operators of the facilities, or management team of a company), as explained below.

Factory B may be an example of an automation environment (e.g., IoT-connected ecosystem). The automation environment of Factory B may comprise electronically controllable equipment. For example, an automobile manufacturing Factory B has assembly line with sensors, actuators, and effectors, lighting systems, HVAC systems with temperature sensors, etc. It will be obvious to those skilled in the art that such electronically controllable equipment and/or devices are provided by way of example only. Each of these pieces of electronically controllable equipment and/or devices may be internet-connected and thus is capable of providing data for the operator of Factory B and the management team of Company A. Company A may also own other automobile manufacturing Factories H, I, and J, and a Warehouse C which stores parts for installation, such as brake components for cars. In many cases, each of the facilities B, H, I, J and C has tens of thousands of devices producing data, and they spread across millions of square feet, and use a multitude of protocols. Due to the lack of interoperability between the variety of IoT devices, in terms of both hardware variations and differences in the software running on them, it is hard to recognize the relationships between different IoT devices, whether within the same facilities or across different facilities. The following operations explain the solutions provided by the present subject matter to the above-mentioned problems.

The method provided by the present subject matter identifies a plurality of data sources associated with an automation environment. For example, a number of IoT devices are identified as data sources because they are capable of generating data associated with their operation respectively. The assembly line sensors, lighting system sensors, temperature sensors, etc. of Factory B may be identified as data sources in this case. The data source identification process may involve passive discovery, active discovery, and/or target interrogation. A variety of other IoT devices of Factories H, I, and J, and a Warehouse C are identified as data sources via the same data source identification process.

After the data source discovery/identification mechanism produces a list of potential data sources, the events or state changes detection component may detect events or state changes associated with each data source in the automation environment. In some embodiments, the events or state changes detection component retrieves state change data previously stored in a database. This operation may be implemented by a gateway, a slave controller, or a computing device on the automation networks, which preferably are attached to the same IP network. The events or state changes detection component may detect the state changes associated with data sources through a number of protocols, such as BACnet, modbus, S7, KNX, or other automation protocol. Nowadays, a large number of data sources are cloud-based, with MQTT bridge or HTTP bridge to communicate with the cloud. In the cases when a data source (e.g., an IoT device) is a MQTT bridge device, the state of the IoT device may be monitored and detected by the platforms and systems of the present subject matter through the MQTT bridge. In particular, a message may be published to the device state MQTT topic, which may be associated with device ID. A database may store or register this event changes in a registry, preferably associated with a timestamp. In the cases when a data source (e.g., an IoT device) is a HTPP bridge device, the state of the IoT device may be monitored and detected by the platforms and systems of the present subject matter through the HTPP bridge. For example, the IoT device may communicate with the platforms and systems of the present subject matter with a request to set state to a different value than the current value. When there is a difference in data value or data structure between the state data and the configuration data (e.g., previously parameters associated with the data source), it is an indication of state change and will be registered in a registry, a database table, an index or the like for later use by the relationship determination mechanism. For example, if the temperature data extracted from temperature sensor O at 8 PM on Jan. 27, 2021 is 27° C.; and the temperature data extracted from the same temperature sensor O at 11 PM on the same day (Jan. 27, 2021) is 20° C., then this is a state change associated with the temperature sensor O and will be stored as a state change in a database.

Following detecting the state changes associated with a number of IoT devices, the storage component may store the data (e.g., events, state changes) in a format that is suitable for later use. For example, a simple relational database could be used by events or state changes storage component. In another example, a combination of relational database and a time-series database may be used by the storage component. In another preferred example, the events or state changes storage component utilizes a graph database to store the mapped data. A graph database is a database that uses graph structure for semantic queries with nodes (please note that "node" and "vertex" are used interchangeably in this application), edges, and properties to represent and store data. The data storage component (e.g., events or state changes storage mechanism) of the present subject matter provides a data structure wherein each vertex (node) in the graph also has a time-series store to capture state changes overtime. The time-series store may be a standalone database, or it can be defined as a property of the vertex (node). For example, the temperature data extracted from temperature sensor O at 8 PM on Jan. 27, 2021 may be stored in a graph database. The node in the graph may represent sensor O (which is a data source according to the present subject matter) and the value is 27° C. The timestamp 8 PM on Jan. 27, 2021 is stored as property for this node in the graph of the graph database. The time-series store may be associated with the nodes, and it may reflect the state changes overtime and provide a user with actionable insight. Subsequently, for example, the temperature data extracted from the same temperature sensor O at a later time, such as at 11 PM on Jan. 27, 2021 may be stored in the graph database. The same node in the graph still represents sensor O and the value is changed to 20° C. The timestamp 11 PM on Jan. 27, 2021 is stored as property for this node in the graph of the graph database. This constitute an event or state change associated with sensor O. These events or state changes associated with every IoT devices are observed by the present platforms and systems to determine relationships between data sources as described in more details below.

Following the storage operation of events or state changes associated with data sources, the platforms or systems of the present subject matter may proceed to detect synchrony in the detected events. In some embodiments, the present platforms and systems collect the detected events or state changes for a period of time (e.g., a few hours, a few days, a few weeks, or a few months), so to provide enough data to the synchrony detection operation. In some other embodiments, the synchrony detection component retrieves historical data and real-time data regarding events and state changes to detect synchrony. In yet other embodiments, the synchrony detection component may work with a cycling command issuing component (which changes the parameters associated with one or more IoT devices) to detect synchrony. In some embodiment, the synchrony detection component identifies combinatorial pairs of data sources having an event or state change within a predetermined time window, and conducts pairwise testing by applying an algorithm to the stored detected events or state changes. As described above, the platforms or systems of the present subject matter identify a plurality of data sources (e.g., IoT devices), detect and store events and state changes associated with these data sources. These stored and detected events and state changes may be analyzed by the synchrony detection component to identify the combinatorial pairs. Preferably, this analysis is performed on the events or state changes within a predetermined time window. For example, a temperature sensor O has an event change between 8 PM and 11 PM, wherein the value (representing the temperature) in the database drops from 27° C. to 20° C. During the same period of time, a HVAC system P is turned off (manually, or according to a preset schedule). This power down event of the HVAC system is previously detected and stored in the database as well. The synchrony detection mechanism may identify these two IoT devices as a potential combinatorial pair because of the synchrony between the state changes associated with temperature sensor O and HVAC system P during the same time window (i.e., 8 PM to 11 PM). Notice that there may be other factors affecting the temperature as well, the identified potential combinatorial pairs will be tested later with an algorithm to determine whether there is a true combinatorial pairing relationship between them. For example, a machine learning algorithm may perform a pairwise testing for each identified potential combinatorial pair. In some embodiments, the machine learning algorithm may closely monitor any events or state changes during another time window of a day, a week, a month, or a year. For example, in the above example related to the temperature sensor O and HVAC system P, it is possible that the HVAC system is located on the west side of a big facility, and the temperature sensor O is located on the east side of the facility. The temperature drop is because of the temperature drop between daytime and nighttime, or because of the power off of an assembly line near sensor O. The machine learning algorithm may perform pairwise testing for this pair of data source (i.e., temperature sensor O and HVAC system P) by monitor other events. If during another period of time that the HVAC system P is powered off for some reason, but the temperature sensor O's value (i.e., temperature) does not drop, then they are not a true combinatorial pair and should be de-linked in a database. If every time or almost every time when the HVAC system P is powered off (or turned down), there is corresponding value changes with temperature sensor O, then it is safe to conclude that they are a combinatorial pair. The machine learning (ML) algorithm may perform this type of pairwise testing automatically, once properly trained, for all the identified potential combinatorial pairs.

Next, a relationship determination component may determine relationships between data sources (e.g., combinatorial pairs). The relationships between the data sources comprises: one or more explicitly defined relationships, one or more transitive relationships, one or more implicit relationships, one or more geospatial relationships, or a combination thereof. In some embodiments, the relationship determination component may utilize different techniques to determine the relationships between different data sources, for example, data profiling or data visualization. A machine learning algorithm may be deployed to analyze data and determine the relationship between data sources. For example, the machine learning algorithm may inquiry the historical events or state changes that the platforms and systems have detected for the potential combinatorial pairs.

These events or state changes may be input to the machine learning algorithm to identify a correlation between different data sources (e.g., relationship between IoT device A and IoT device B). Any determined relationships may be training examples that can be used to train the machine learning algorithm. For example, in the above example related to the temperature sensor O and HVAC system P, if the machine learning algorithm determines that the temperature sensor O and HVAC system P constitute a true combinatorial pair, and the HVAC system P affects the reading (i.e., value/temperature) of the temperature sensor O, then the relationship determination component determines that there is a relationship between these two data sources. This relationship is stored in a database to provide actionable insight. A relational database or a graph database may be used to store the determined relationship.

In the embodiments where a graph database is utilized, the relationship between different nodes (i.e., each node represents an IoT device) may be stored as edges between the nodes. For example, the relationship between the temperature sensor O and a lighting sensor R may be defined by the edge between them. The edge may provide important information to a user, for example, when the lights are on (as shown by the lighting sensor R) near the temperature sensor O, the temperature may increase because the light bulbs produce heat. As we know the heat produced by light bulbs is considered as waste. A user provided by the information represented by the edge between the lighting sensor R and temperature sensor O may analyze the energy waste produced by a certain brand/type of light bulbs and make the decision on whether it is cost-efficient to replace these light bulbs. Preferably, the edges in a graph database may represent the directionality between data sources, i.e., whether one data source's state change is the cause to the other data source's state change. This may be referred to as causality relationship. In some embodiments, the edges in a graph of the graph database are directed (i.e., has a direction from one node to the connecting node). In a directed graph, the edges connecting two nodes have different meanings, depending on their direction. For example, the direction from Node A (e.g., IoT device A) to Node B (e.g., IoT device B) may represent a causality relationship between the two nodes (i.e., IoT devices or data sources). As describe above, because the events or state changes associated with data sources are stored with time-series store in a database, the resulting data contains a living representation of the data rather than a static view of the data. In these operations, the evolved and evolving vertices (nodes) in the graph may provide both provenance and history associated with them, and thus provide actionable insights to management teams or other department to optimize facilities. With the determined relationships between nodes (e.g., data sources) stored as edges in the graph database, the present platforms and systems provides a user with a rich data presentation regarding the operations of IoT devices within a large facility or even between different facilities.

To provide even better understanding of the relationships between IoT devices, and to reduce any system error, the present platforms and systems provide an error correction feedback component. The error correction feedback component may retire once the platforms and systems are tuned to provide optimal results. In some cases, a determined relationship between two data sources can be a relationship that does not make sense, and is the result of a pure coincidence. For example, a temperature sensor O's reading always drops by 5 degrees between 5 PM and 6 PM, and a HVAC system P located in a different facility is always turned off at 5 PM. Based on the reading of the events and state changes, the system may determine there is causal relationship between the temperature sensor O and the HVAC system P, wherein the Power off event of the HVAC system P is the cause of the dropping of the temperature sensor O's reading. However, if a user is presented with this relationship, he or she can quickly recognize that the HVAC system P should not have any meaningful relationship with temperature sensor O because they are not in the same facility. The user may then manually de-link the relationship between the two data sources in the database (e.g., graph database). This de-link operation may be facilitated by the error correction feedback component. In some embodiments, the error correction feedback component marks this de-link operation as a training example to feed to the machine learning algorithm. The machine learning algorithm may train itself with this operation. Overtime, the machine learning algorithm may understand that data sources from different facilities, even appear to be combinatorial pairs and have state changes corresponding to each other, may not be true combinatorial pairs and should not be assigned with a relationship between them. Further, the machine learning algorithm may train itself to detect errors by itself. In some embodiments, the error correction feedbacks may propagate throughout the entire platforms and system of the present subject matter, thus other potential errors may be flagged and detected. With the deployment of machine learning algorithm, the relationship determination component, and the error correction component, the platforms and systems of present subject matter may continuously evolve and provide even more accurate and effortless relationship determination operations.

The relationships determined by the present platforms and system may provide actionable insight to a user. The relationships between different IoT devices provide an easier-to-understand data format than the raw data, and present a living representation of the dynamics between a number of IoT devices. This enables a user to quickly identify the actions that are needed to optimize the operation of a factory, a number of factories and warehouses, and even financial models associated with the operations of factories. Note that although this Use Case takes an industrial environment as an example, the present subject matter may also be used in a number of different automation environments, such as a smart home, a medical or healthcare facility, a nursing home, an agricultural plant, and an energy management system.

While preferred embodiments of the present subject matter have been shown and described herein, it will be obvious to those skilled in the art that such embodiments are provided by way of example only. Numerous variations, changes, and substitutions will now occur to those skilled in the art without departing from the present subject matter. It should be understood that various alternatives to the embodiments of the present subject matter described herein may be employed in practicing the present subject matter.

What is claimed is:

1. A computer-implemented method comprising:
   a) identifying a plurality of data sources associated with an automation environment;
   b) detecting one or more events or one or more state changes in the data sources;
   c) storing the detected events or state changes;
   d) detecting synchrony in the detected events or state changes by performing operations comprising: i) identifying combinatorial pairs of data sources having an event or state change occurring within a predetermined time window; and ii) conducting pairwise testing for each identified combinatorial pair of data sources by applying an algorithm to the events or state changes occurring within the predetermined time window;

e) determining one or more relationships for at least one identified combinatorial pair of data sources, wherein the one or more relationships comprise directionality information associated with the relationships, wherein the directionality information is indicative of a controller-controlled relationship between the data sources in the combinational pairs, respectively, and f) storing the determined relationships in a database.

2. The method of claim 1, wherein the automation environment comprises at least one networked industrial or commercial automation system.

3. The method of claim 1, wherein the plurality of data sources comprises at least one device, at least one programmable logic controller (PLC), at least one automation controller, at least one data file, at least one cloud service, or a combination thereof.

4. The method of claim 1, wherein the plurality of data sources comprises at least one device utilizing a first communications protocol and at least one device utilizing a second communications protocol, wherein the first communications protocol is different from the second communications protocol.

5. The method of claim 1, wherein the identifying the plurality of data sources is performed by passive discovery, active discovery, target interrogation, or a combination thereof.

6. The method of claim 5, wherein the passive discovery comprises observing traffic on a network.

7. The method of claim 6, wherein the passive discovery comprises identifying an origin or a destination for the traffic on the network.

8. The method of claim 5, wherein the active discovery comprises IP subnet scanning on a network, port scanning on a network, protocol specific ID enumeration on a control bus, issuing protocol specific discovery commands on a network, or a combination thereof.

9. The method of claim 5, wherein the target interrogation comprises introspecting at least one PLC on a network.

10. The method of claim 1, the detecting one or more events or one or more state changes comprises passive inspection of packets or payloads on an automation control network associated with the automation environment.

11. The method of claim 1, wherein the detecting one or more events or one or more state changes comprises inspection of communications in accordance with a communication protocol.

12. The method of claim 11, wherein the communication protocol comprises S7, BACnet, KNX, or a combination thereof.

13. The method of claim 1, wherein the detecting one or more events or one or more state changes comprises continuously monitoring the automation environment for a predefined monitoring period.

14. The method of claim 1, wherein the detecting one or more events or one or more state changes is performed by a gateway in communication with the automation environment directly, indirectly, via a cloud service, or any combination thereof.

15. The method of claim 1, wherein the detecting one or more events or one or more state changes is performed by a slave controller in communication with the automation environment directly, indirectly, via a cloud service, or any combination thereof.

16. The method of claim 1, wherein the detecting one or more events or one or more state changes is performed by a computing device in communication with the automation environment directly, indirectly, via a cloud service, or any combination thereof.

17. The method of claim 1, wherein the detected events or state changes are stored in a timeseries database.

18. The method of claim 17, wherein the timeseries database comprises a stream of events or state changes for each identified data source associated with an automation environment.

19. The method of claim 1, further comprising selecting the algorithm from a plurality of algorithms.

20. The method of claim 1, wherein the algorithm comprises one or more of the following: Pearson correlation, Time Lagged Cross Correlation (TLCC), Windowed TLCC, Dynamic Time Warping (DTW), and Instantaneous Phase Synchrony.

21. The method of claim 20, wherein the TLCC comprises a Granger causality test.

22. The method of claim 20, wherein the Instantaneous Phase Synchrony comprises a Hilbert transform.

23. The method of claim 1, wherein the algorithm comprises a machine learning model.

24. The method of claim 23, wherein the machine learning model comprises one or more of the following: one or more neural networks, one or more deep neural networks, one or more support vector machines (SVM), one or more Bayesian models, linear regression, logistic regression, or k-means clustering.

25. The method of claim 1, wherein the one or more relationships comprises one or more of the following: one or more explicitly defined relationships, one or more transitive relationships, one or more implicit relationships, one or more geospatial relationships.

26. The method of claim 1, further comprising providing error correction data pertaining to the one or more relationships as feedback to improve the algorithm.

27. The method of claim 1, wherein the steps are performed by a computer-based platform automatically.

28. A system comprising at least one computing device comprising at least one processor, a memory, and instructions executable by the at least one processor to create an application comprising:

a) a software module identifying a plurality of data sources associated with an automation environment;

b) a software module detecting one or more events or one or more state changes in the data sources;

c) a software module storing the detected events or state changes;

d) a software module detecting synchrony in the detected events or state changes by performing operations comprising: i) identifying combinatorial pairs of data sources having an event or state change occurring within a predetermined time window; and ii) conducting pairwise testing for each identified combinatorial pair of data sources by applying an algorithm to the events or state changes occurring within the predetermined time window;

e) a software module determining one or more relationships for at least one identified combinatorial pair of data sources, wherein the one or more relationships comprise directionality information associated with the relationships, wherein the directionality information is indicative of a controller-controlled relationship between the data sources in the combinational pairs, respectively, and f) a software module storing the determined relationships in a database.

29. A non-transitory computer-readable storage media encoded with instructions executable by one or more processors to provide an application comprising:
- a) a software module identifying a plurality of data sources associated with an automation environment;
- b) a software module detecting one or more events or one or more state changes in the data sources;
- c) a software module storing the detected events or state changes;
- d) a software module detecting synchrony in the detected events or state changes by performing operations comprising: identifying combinatorial pairs of data sources having an event or state change occurring within a predetermined time window; and conducting pairwise testing for each identified combinatorial pair of data sources by applying an algorithm to the events or state changes occurring within the predetermined time window;
- e) a software module determining one or more relationships for at least one identified combinatorial pair of data sources, wherein the one or more relationships comprise directionality information associated with the relationships, wherein the directionality information is indicative of a controller-controlled relationship between the data sources in the combinational pairs, respectively, and
- f) a software module storing the determined relationships in a database.

* * * * *